(12) United States Patent
Kataoka et al.

(10) Patent No.: US 12,095,598 B2
(45) Date of Patent: Sep. 17, 2024

(54) MASTER MODULE AND NON-TRANSITORY COMPUTER READABLE MEDIUM

(71) Applicant: OMRON Corporation, Kyoto (JP)

(72) Inventors: Nobuo Kataoka, Kyoto (JP); Seiji Mizutani, Kyoto (JP)

(73) Assignee: OMRON Corporation, Kyoto (JP)

( * ) Notice: Subject to any disclaimer, the term of this patent is extended or adjusted under 35 U.S.C. 154(b) by 240 days.

(21) Appl. No.: 17/610,161

(22) PCT Filed: Feb. 28, 2020

(86) PCT No.: PCT/JP2020/008503
§ 371 (c)(1),
(2) Date: Nov. 10, 2021

(87) PCT Pub. No.: WO2020/261646
PCT Pub. Date: Dec. 30, 2020

(65) Prior Publication Data
US 2022/0224574 A1  Jul. 14, 2022

(30) Foreign Application Priority Data

Jun. 24, 2019  (JP) ................................. 2019-116589

(51) Int. Cl.
*H04L 25/49* (2006.01)
*H04B 3/02* (2006.01)

(52) U.S. Cl.
CPC ............... *H04L 25/49* (2013.01); *H04B 3/02* (2013.01)

(58) Field of Classification Search
CPC . H04L 25/49; H04L 25/4917; H04L 25/0264; H04B 3/02; G05B 19/058; H04Q 9/00
See application file for complete search history.

(56) References Cited

U.S. PATENT DOCUMENTS

| | | | |
|---|---|---|---|
| 2004/0073086 A1* | 4/2004 | Abe | H04N 23/65 600/109 |
| 2014/0270804 A1* | 9/2014 | Hoshida | H04J 14/0272 398/154 |

(Continued)

FOREIGN PATENT DOCUMENTS

| | | |
|---|---|---|
| CN | 107342909 | 11/2017 |
| EP | 2782356 | 9/2014 |

(Continued)

OTHER PUBLICATIONS

"Search Report of Europe Counterpart Application", issued on Apr. 21, 2023, pp. 1-18.

(Continued)

*Primary Examiner* — Sam K Ahn
*Assistant Examiner* — Amneet Singh
(74) *Attorney, Agent, or Firm* — JCIPRNET

(57) ABSTRACT

A master module (52A) mediates communication between an electric apparatus (6) to which a signal processing device (100) is connected and apparatus control devices (3, 4B) that control the electric apparatus. The master module is provided with: a plurality of first communication ports (54) for respectively connecting to a plurality of signal processing devices via a communication cable (51) for transmitting a superimposed signal; a data signal processing unit (44) that extracts a data signal from the superimposed signal received through the first communication port; an abnormality information generation unit (504) that, on the basis of status information that is included in the extracted data signal and indicates an abnormal state of the electric apparatus, generates abnormality information which indicates information related to an abnormality that has occurred; and an information output unit (503) that outputs the abnormality infor- (Continued)

mation such that the apparatus control devices can acquire the abnormality information.

19 Claims, 20 Drawing Sheets

(56) References Cited

U.S. PATENT DOCUMENTS

| | | | | |
|---|---|---|---|---|
| 2017/0317916 | A1* | 11/2017 | Ozaki | ............... H04L 43/0817 |
| 2018/0091358 | A1 | 3/2018 | Sasaki et al. | |
| 2019/0164393 | A1* | 5/2019 | Saeki | ..................... G08B 5/36 |

FOREIGN PATENT DOCUMENTS

| | | |
|---|---|---|
| EP | 3376677 | 9/2018 |
| EP | 3407148 | 11/2018 |
| JP | H02259996 | 10/1990 |
| JP | 2011114449 | 6/2011 |
| JP | 2013090275 | 5/2013 |
| JP | 2018151915 | 9/2018 |
| JP | 2019012906 | 1/2019 |

OTHER PUBLICATIONS

"International Search Report (Form PCT/ISA/210) of PCT/JP2020/008503," mailed on Apr. 7, 2020, with English translation thereof, pp. 1-4.

"Written Opinion of the International Searching Authority (Form PCT/ISA/237) of PCT/JP2020/008503," mailed on Apr. 7, 2020, with English translation thereof, pp. 1-8.

"IO-Link Interface and System Specification," version 1.1. 2, Jul. 2013, IO-Link Community, Order No. 10. 002, 4 Overview of SDCI, pp. 1-262.

"Office Action of China Counterpart Application", issued on Jun. 29, 2023, with English translation thereof, pp. 1-27.

* cited by examiner

| CONTROLLER ID | NETWORK ID | NODE ID | BIT VALUE |

| CONTROLLER ID | ADDRESS INFORMATION | | | APPARATUS INFORMATION | |
|---|---|---|---|---|---|
| | NETWORK ID | NODE ID | BIT VALUE | APPARATUS FORMAT | APPARATUS ID |
| PLC-1 | Net1 | Node1 | 00 | Wxxx | 0001 |
| PLC-1 | Net1 | Node1 | 01 | WLCA-N | 12344 |
| PLC-1 | Net1 | Node1 | 02 | ***** | ****** |
| PLC-1 | Net1 | Node1 | 03 | ***** | ****** |
| PLC-1 | Net1 | Node1 | ·· | ·· | ·· |
| PLC-1 | Net1 | Node2 | 00 | WLCAN | 0101 |
| PLC-1 | Net1 | Node2 | 01 | Wxxx | 0101 |
| PLC-1 | Net1 | Node2 | ·· | ·· | ·· |
| PLC-1 | Net2 | Node1 | 00 | ***** | ****** |
| PLC-1 | Net2 | Node1 | 01 | ***** | ****** |
| PLC-1 | ·· | ·· | ·· | ·· | ·· |
| PLC-2 | Net1 | Node1 | 00 | ***** | ****** |
| PLC-2 | Net1 | Node1 | 01 | ***** | ****** |
| ·· | ·· | ·· | ·· | ·· | ·· |

MASTER MODULE AND NON-TRANSITORY COMPUTER READABLE MEDIUM

CROSS-REFERENCE TO RELATED APPLICATION

This application is a 371 application of the International PCT application serial no. PCT/JP2020/008503, filed on Feb. 28, 2020, which claims the priority benefits of Japan Patent Application No. 2019-116589, filed on Jun. 24, 2019. The entirety of each of the above-mentioned patent applications is hereby incorporated by reference herein and made a part of this specification.

TECHNICAL FIELD

The present invention relates to a master module which can be connected to a signal processing device or the like that processes an electric signal and a control program of an apparatus control device connected to a signal processing device or the like via the master module.

BACKGROUND ART

In the related art, there are three-wire electric apparatuses (sensors or the like) that transmit and receive communication data in addition to detected information. Such electric apparatuses, at least two power lines and one signal line are necessary to supply power and to input and output signals. As one of the three-wire communication methods, there is IO-Link (registered trademark). Non-Patent Literature 1 is a specification of IO-Link.

CITATION LIST

Patent Literature

[Patent Literature 1]
Japanese Patent Laid-Open No. 2019-12906 (disclosed on Jan. 24 2019)
[Patent Literature 2]
Japanese Patent Laid-Open No. 2018-151915 (disclosed on Sep. 27 2018)

Non-Patent Literature

[Non-Patent Literature 1]
"IO-Link Interface and System Specification," version 1.1. 2, July 2013, IO-Link Community, Order No: 10. 002, 4 Overview of SDCI, p32 to p37

SUMMARY OF INVENTION

Technical Problem

However, in the technology of Non-Patent Literature 1, there is a problem that the number of wires is large. In the technology of Non-Patent Literature 1, for example, a sensor converts a signal detected by the sensor into communication data and transmits the communication data to the outside. Therefore, there is a problem that a time until an external apparatus recognizes a detected signal for a conversion process becomes long and circuit configurations of the sensor and the external apparatus are complicated.

On the other hand, as examples of technologies for reducing the number of wires, it is conceivable that the number of wires be reduced by using a superimposed signal in which a signal related to an operation element is superimposed on a data signal for communication (for example, see Patent Literatures 1 and 2).

Incidentally, when a series of systems using a superimposed signal are introduced, apparatuses, devices, or the like which do not correspond to communication using the superimposed signal can be contrived to be embedded into the above-described series of systems and used from the viewpoint of improving the degree of freedom of system construction and improving convenience.

An objective of an aspect of the present disclosure is to provide a master module and a control program of an apparatus control device, which enable an apparatus or the like which does not correspond to communication using a superimposed signal to be used in a system using the superimposed signal.

Solution to Problem

In the invention, the following configurations are adopted to solve the above-described problems as examples of the present disclosure.

That is, a master module according to an aspect of the present disclosure is a master module that mediates communication between an electric apparatus to which a signal processing device is connected and an apparatus control device that controls the electric apparatus. The signal processing device includes a superimposition circuit that transmits an operation signal in accordance with an operation element state of the electric apparatus to another device and transmits a data signal indicating predetermined information as a superimposed signal superimposed on the operation signal to the other device, and an information storage unit that stores the predetermined information. The master module includes a plurality of first communication ports that respectively connects a plurality of the signal processing devices via communication cables for transmitting the superimposed signal; a data signal processing unit that extracts the data signal from the superimposed signal received through the first communication port; an abnormality information generation unit that, based on status information that is included in the extracted data signal and indicates an abnormal state of the electric apparatus, generates abnormality information which indicates information related to an abnormality that has occurred; and an information output unit that outputs the abnormality information so that the apparatus control device is able to acquire the abnormality information.

A control program according to another aspect of the present disclosure is a control program of an apparatus control device controlling an electric apparatus to which a signal processing device is connected by communicating via a master module. The signal processing device includes a superimposition circuit that transmits an operation signal in accordance with an operation element state of the electric apparatus to another device and transmits a data signal indicating predetermined information as a superimposed signal superimposed on the operation signal to the other device, and an information storage unit that stores the predetermined information. The control program causes the apparatus control device to perform: an abnormality detection step of detecting that an abnormality has occurred in accordance with reception of abnormality information which is transmitted by the master module and indicates information regarding the abnormality occurring in the electric apparatus; an apparatus specifying step of specifying an electric apparatus in which the abnormality has occurred based on first information which is included in abnormality detailed information in the abnormality information transmitted by the master module and is used to specify the electric apparatus in which the abnormality has occurred; and an abnormality specifying step of specifying content of the abnormality which has occurred based on second information which is included in the abnormality detailed information and indicates the content of the abnormality which has occurred.

Advantageous Effects of Invention

According to the aspect of the present disclosure, it is possible to provide a master module and a control program of an apparatus control device, and the like which enable an apparatus, a device, or the like which does not correspond to communication using a superimposed signal to be used in a system using the superimposed signal.

BRIEF DESCRIPTION OF DRAWINGS

FIG. 12 is a diagram illustrating an example of a data structure of a configuration table.

DESCRIPTION OF EMBODIMENTS

First Embodiment (Configuration of Communication System 1)

Figure 2:
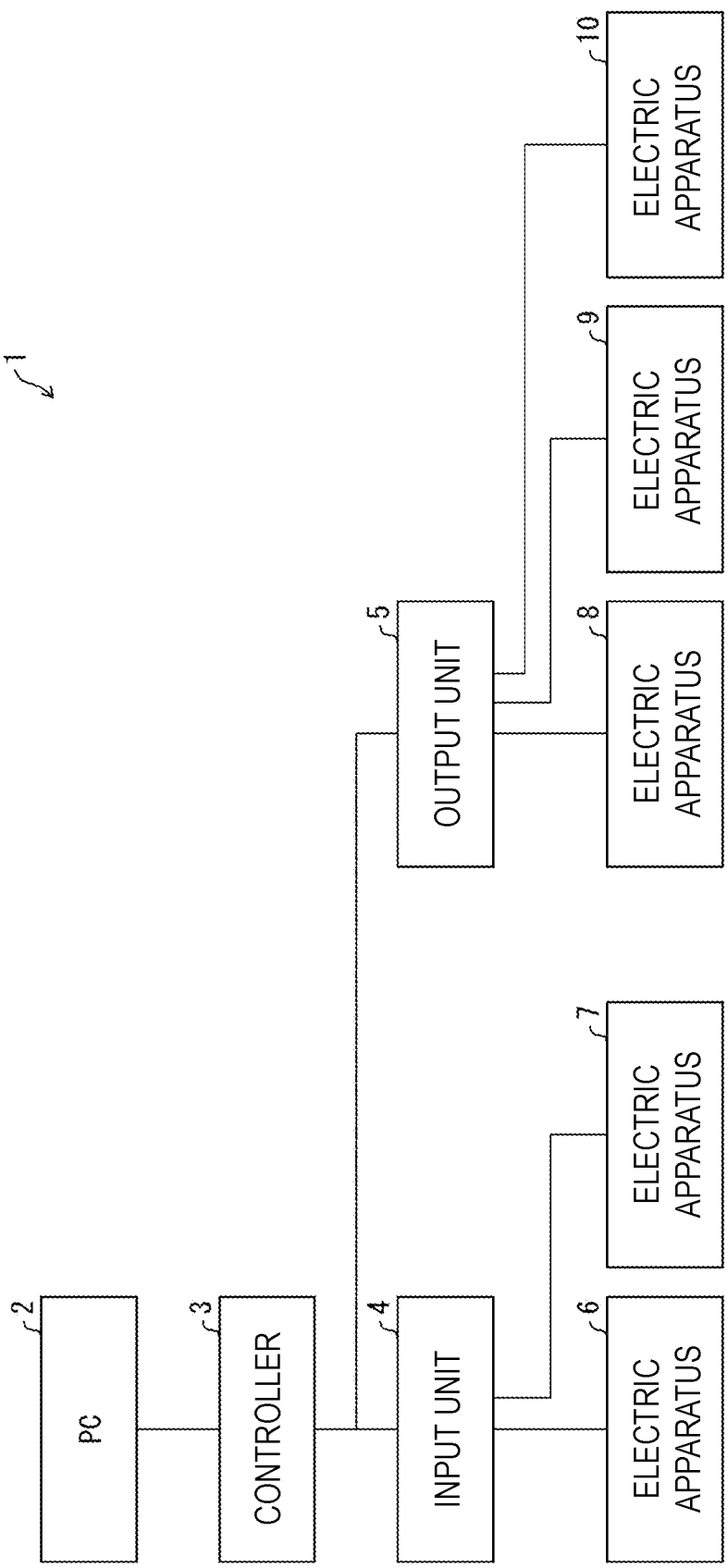
FIG. 2 is a block diagram illustrating a configuration of a communication system according to the aspect of the present invention.

FIG. 2 is a block diagram illustrating a configuration of a communication system according to the embodiment. A communication system 1 includes a personal computer 2 (a PC or an information processing device), a controller 3, an input unit 4, an output unit 5, and electric apparatuses 6 to 10. The PC 2 is connected to the controller 3. The PC 2 receives information regarding the electric apparatuses 6 to 10 from the controller 3 and transmits a control command to the controller 3. The controller 3 is connected to the input unit 4 and the output unit 5. The controller 3 transmits a signal for operating or controlling the electric apparatuses 6 to 10 to the input unit 4 and the output unit 5 in accordance with the control command. The controller 3 transmits signals received from the electric apparatuses 6 to 10 via the input unit 4 or the output unit 5 to the PC 2.

The input unit 4 (receiver) is connected to the electric apparatuses 6 and 7. Each of the electric apparatuses 6 and 7 is connected to the input unit 4 via a pair of signal lines. The input unit 4 causes the electric apparatuses 6 and 7 to operate and transmits signals received from the electric apparatuses 6 and 7 to the controller 3.

The electric apparatuses 6 and 7 operate with power supplied from the input unit 4 and transmit signals in accordance with a state of operation elements included in the electric apparatuses 6 and 7 to the input unit 4. Here, the electric apparatus 6 is a limit switch including a switch as an operation element. The electric apparatus 7 is a sensor including a sensing element as an operation element.

The output unit 5 (receiver) is connected to the electric apparatuses 8 to 10. Each of the electric apparatuses 8 to 10 is connected to the output unit 5 by a pair of signal lines. The output unit 5 causes the electric apparatuses 8 to 10 to operate based on an instruction from the PC 2 and the controller 3 and controls the electric apparatuses 8 to 10. The output unit 5 transmits signals received from the electric apparatuses 8 to 10 to the controller 3.

The electric apparatuses 8 to 10 operate with power supplied from the output unit 5 and are controlled with control signals received from the output unit 5. Here, the electric apparatus 8 is a relay device that includes a coil as an operation element. The electric apparatus 9 is an electric valve including a coil as an operation element. The electric apparatus 10 is an electrically powered actuator including a coil as an operation element.

(Configurations of Electric Apparatus 6 and Input Unit 4)

Figure 1:
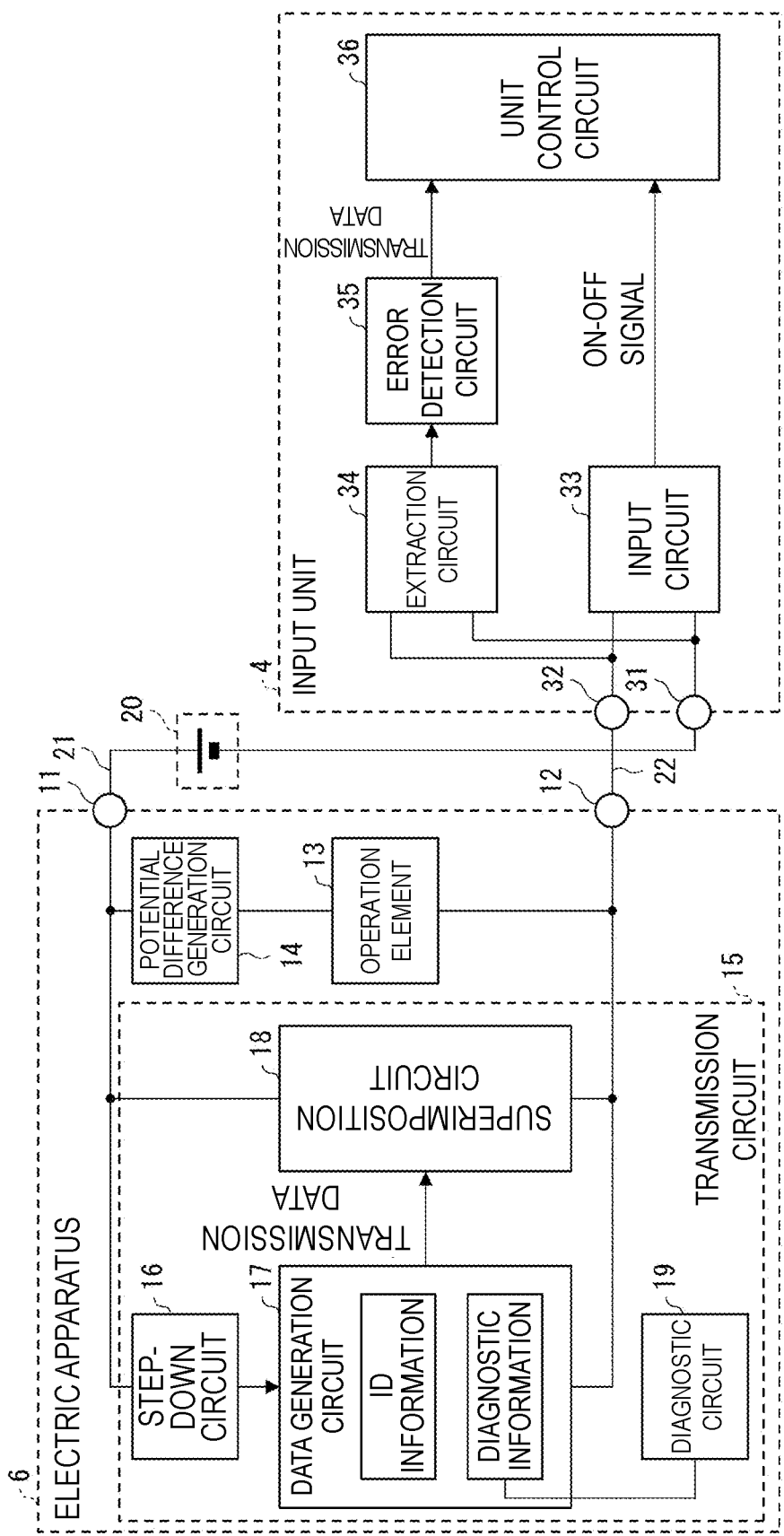
FIG. 1 is a block diagram illustrating configurations of an electric apparatus and an input unit according to an aspect of the present invention.

FIG. 1 is a block diagram illustrating configurations of the electric apparatus 6 and the input unit 4. Here, the electric apparatus 6 (limit switch) and the input unit 4 will be described as an example. The electric apparatus 6 and the input unit 4 are connected to each other by a pair of signal lines 21 and 22. The signal line 21 is connected to a first input terminal 31 of the input unit 4 and a first terminal 11 of the electric apparatus 6. The signal line 22 is connected to a second input terminal 32 of the input unit 4 and a second terminal 12 of the electric apparatus 6. A power supply 20 is provided on a path of the signal line 21. The power supply 20 is a direct-current power supply that generates a predetermined voltage (here, 24 V).

The electric apparatus 6 includes a first terminal 11, a second terminal 12, an operation element 13, a potential difference generation circuit 14, and a transmission circuit 15. The transmission circuit 15 includes a step-down circuit 16, a data generation circuit 17, a superimposition circuit 18, and a diagnostic circuit 19. The operation element 13 is connected between the first terminal 11 and the second terminal 12. The potential difference generation circuit 14 is connected to the operation element 13 in series on an electrifying path between the first terminal 11 and the second terminal 12. A potential of the second terminal 12 is changed in accordance with a state of the operation element 13. That is, the second terminal 12 outputs an output signal (an operation signal) in accordance with a state of the operation element 13 to the outside (a signal line 22).

The transmission circuit 15 is connected between the first terminal 11 and the second terminal 12. The transmission circuit 15 operates using a voltage between the first terminal 11 and the second terminal 12 as a power source. The step-down circuit 16 steps down the voltage between the first terminal 11 and the second terminal 12 to a predetermined voltage and outputs the predetermined voltage to the data generation circuit 17. The data generation circuit 17 operates at a voltage applied from the step-down circuit 16 to generate transmission data to be transmitted to the input unit 4. The transmission data includes, for example, an identifier (ID information) unique to the electric apparatus 6. The data generation circuit 17 outputs the transmission data to the superimposition circuit 18. The superimposition circuit 18 superimposes the received transmission data in the output signal serving as a data signal. Thus, the transmission circuit 15 outputs a superimposed signal in which the data signal is superimposed on the output signal from the second terminal 12 to the signal line 22.

The diagnostic circuit 19 operates at a voltage applied from the step-down circuit 16 to generate diagnostic data representing diagnostic information of the electric apparatus 6. The diagnostic circuit 19 includes a check circuit related to an element (for example, the operation element 13) of the electric apparatus 6 and generates the diagnostic data indicating whether the electric apparatus 6 is normal according to whether an output of the check circuit is normal. The diagnostic circuit 19 outputs the diagnostic data (diagnostic information) to the data generation circuit 17. The data generation circuit 17 may include the diagnostic data in the transmission data.

The input unit 4 includes the first input terminal 31, the second input terminal 32, an input circuit 33, an extraction circuit 34, an error detection circuit 35, and a unit control circuit 36. In FIG. 1, a configuration of a transmission portion with respect to the controller 3 is not illustrated. A potential of the first input terminal 31 is kept constant (for example, GND). The superimposed signal is input from the signal line 22 to the second input terminal 32.

The input circuit 33 extracts the output signal from the superimposed signal and outputs the output signal to the unit control circuit 36. The extraction circuit 34 extracts the data signal from the superimposed signal and outputs the data signal to the error detection circuit 35. The error detection circuit 35 detects an error on the data signal using any data checking method such as CRC check (cyclic redundancy check) or Manchester code check. The error detection circuit 35 outputs the data signal and an error detection result to the unit control circuit 36. When the error detection circuit 35 detects an error from the data signal, the data signal may not be output to the unit control circuit 36. The unit control circuit 36 outputs the output signal and the data signal to the controller 3. The error detection circuit 35 and the unit control circuit 36 can be configured by, for example, one integrated circuit or a plurality of integrated circuits.

(Circuit Configuration of Electric Apparatus 6)

Figure 3:
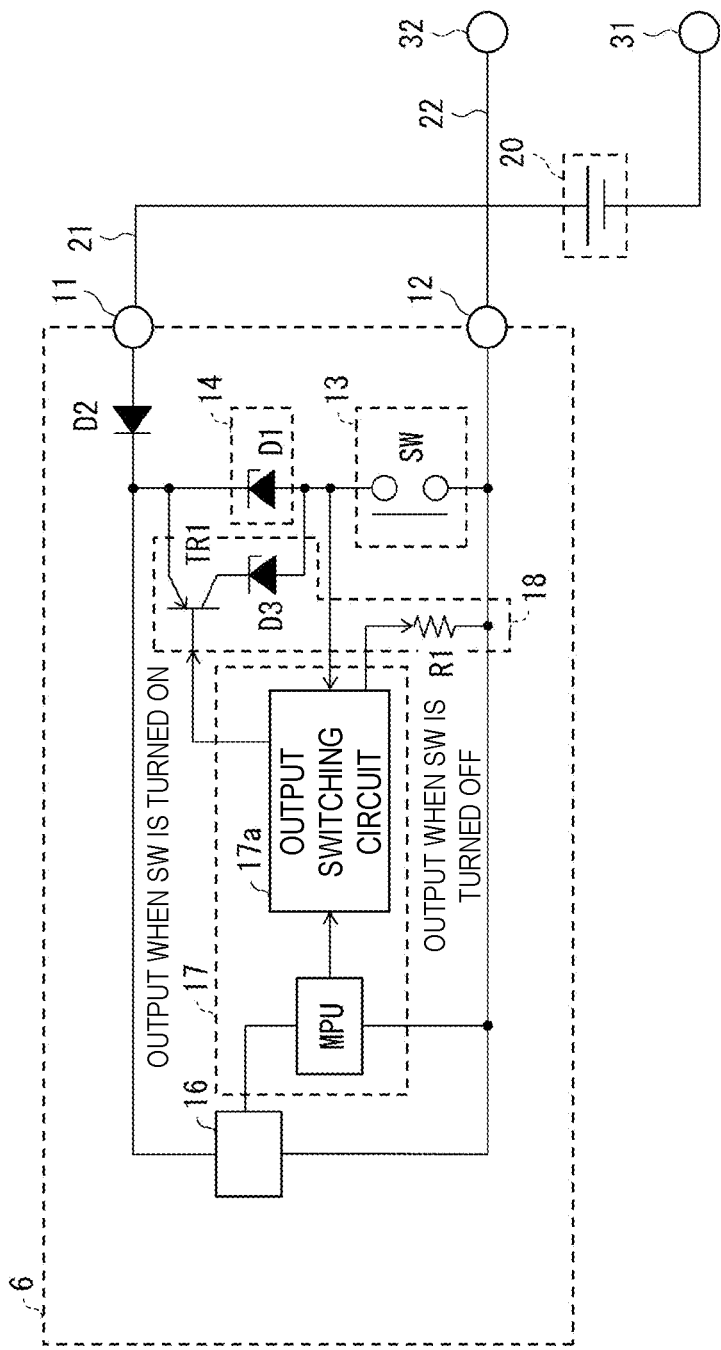
FIG. 3 is a circuit diagram illustrating a configuration of the electric apparatus.

FIG. 3 is a circuit diagram illustrating a configuration of the electric apparatus 6. In FIG. 3, the diagnostic circuit 19 is not illustrated. The potential difference generation circuit 14 includes a diode D1. The diode D1 is a Zener diode. Here, the operation element 13 is a mechanical switch SW. On the electrifying path between the first terminal 11 and the second terminal 12, the diode D2, the diode D1, and the switch SW are disposed in series in this order. The anode of the diode D2 is connected to the first terminal 11. The cathode of the diode D1 is connected to the first terminal 11 via the diode D2.

The step-down circuit 16 is disposed between the first terminal 11 and the second terminal 12 in parallel to the diode D1 and the switch SW.

The data generation circuit 17 includes a micro processing unit (MPU) and an output switching circuit 17*a*. A stepped-down constant voltage (for example, 2.5 V) is supplied as a power source from the step-down circuit 16 to the MPU and the output switching circuit 17*a*. The MPU generates the transmission data and outputs the transmission data to the superimposition circuit 18 via the output switching circuit 17*a*. A voltage of a node between the switch SW and the diode D1 is input to the output switching circuit 17*a*. The output switching circuit 17*a* determines whether the switch SW is turned ON or OFF from the voltage. The output switching circuit 17*a* changes an output destination of the transmission data in accordance with ON-OFF of the switch SW. When the switch SW is turned ON, the output switching circuit 17*a* outputs the transmission data to a base terminal of the transistor TR1. When the switch SW is turned OFF, the output switching circuit 17*a* output the transmission data to a resistor R1.

The superimposition circuit 18 includes the resistor R1, a diode D3, and the transistor TR1. The diode D3 is a Zener diode. One end of the resistor R1 is connected to the output switching circuit 17*a* and the other end of the resistor R1 is connected to the second terminal 12.

The base terminal of the transistor TR1 is connected to the output switching circuit 17*a*. An emitter terminal of the transistor TR1 is connected to the first terminal 11 via the diode D2 and a collector terminal of the transistor TR1 is connected to the cathode of the diode D3. The anode of the diode D3 is connected to a node between the switch SW and the diode D1.

The diode D2 is a protective element and can be omitted.
(Circuit Configuration of Input Unit 4)

Figure 4:
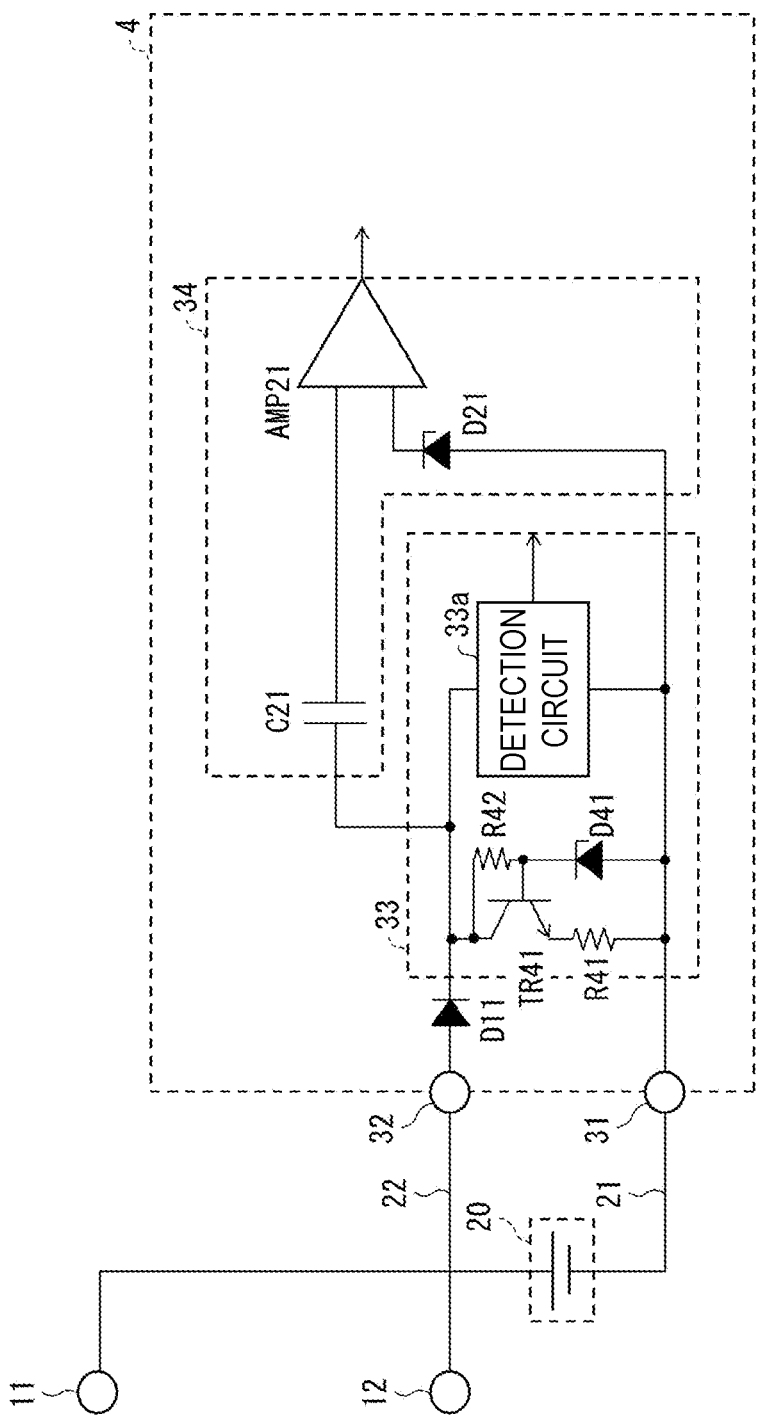
FIG. 4 is a circuit diagram illustrating a configuration of the input unit.

FIG. 4 is a circuit diagram illustrating a configuration of the input unit 4. Here, the input circuit 33 and the extraction circuit 34 in the input unit 4 are illustrated. The anode of the diode D11 which is a protective element is connected to the second input terminal 32.

The input circuit 33 includes resistors R41 to R42, a diode D41, a transistor TR41, and a detection circuit 33a. The diode D41 is a Zener diode. A collector terminal of the transistor TR41 is connected to the cathode of the diode D11 and the emitter terminal of the transistor TR41 is connected to one end of the resistor R41. The other end of the resistor R41 is connected to the first input terminal 31. One end of the resistor R42 is connected to the cathode of the diode D11 and the other end of the resistor R42 is connected to the cathode of the diode D41. The anode of the diode D41 is connected to the first input terminal 31. The base terminal of the transistor TR41 is connected to the other end of the resistor R42. The resistors R41 to R42, the diode D41, and the transistor TR41 configure a constant current circuit. When a predetermined voltage or more is applied to both ends of the constant current circuit, a current flowing in the constant current circuit becomes constant. The resistor R42, the diode D41, and the transistor TR41 may be omitted and only the resistor R41 may be connected to the detection circuit 33a in parallel. The constant current circuit may be connected to the detection circuit 33a in series and only the resistor R41 may be connected to the detection circuit 33a in series.

The detection circuit 33a determines whether the switch SW is turned ON or OFF from a voltage between the first input terminal 31 and the second input terminal 32. The detection circuit 33a outputs a determination result (information regarding ON or OFF of the switch SW).

The extraction circuit 34 includes a capacitor C21, a diode D21, and an operational amplifier AMP21. The diode D21 is a Zener diode. One end of the capacitor C21 is connected to the cathode of the diode D11 and the other end of the capacitor C21 is connected to an inverted input terminal of the operational amplifier AMP21. The cathode of the diode D21 is connected to a non-inverted input terminal of the operational amplifier AMP21. The anode of the diode D21 is connected to the first input terminal 31.

(Operations of Electric Apparatus 6 and Input Unit 4)

The electric apparatus 6 is a limit switch. ON and OFF of the switch SW are mechanically switched between in accordance with a position of an object. The first input terminal 31 of the input unit 4 is set to 0 V and a constant potential (24 V) is input to the first terminal 11. A potential of the second terminal 12 is changed in accordance with an ON or OFF (conductive/cutoff) state of the switch SW.

When the switch SW is turned on, a potential difference between both ends of the switch SW in the conductive state is 0. Therefore, a potential of the second terminal 12 becomes a value stepped down from the potential of the first terminal 11 by the potential difference generation circuit 14 (diode D1).

When the switch SW is turned off, no current flows in the switch SW and the potential difference generation circuit 14. Therefore, when the switch SW is turned off, a potential of the second terminal 12 is a value lower than when the switch SW is turned on.

In this way, the second terminal 12 transmits an output signal in accordance with the ON or OFF state of the switch SW to the outside. When a potential of the output signal is high (H), it is indicated that the switch is in the ON state. When the potential of the output signal is low (L), it is indicated that the switch is in the OFF state. Since the height of the potential of the output signal indicates the state (ON or OFF) of the switch, the output signal can be said to be an analog signal.

On the other hand, irrespective of the state of the switch SW, a potential difference occurs between both ends of the potential difference generation circuit 14. Therefore, when the switch SW is turned on or off, a voltage equal to or greater than a certain value (for example, 2.5 V) is applied to the step-down circuit 16. Therefore, when the switch SW is turned on or off, the step-down circuit 16 can output a voltage (2.5 V) at which at least the data generation circuit 17 can operate. Accordingly, when the switch SW is turned on or off, the data generation circuit 17 and the superimposition circuit 18 can operate.

The MPU generates transmission data. The transmission data is digital data. The output switching circuit 17a outputs the transmission data as an H/L voltage from the output terminal in accordance with ON or OFF of the switch SW.

When the switch SW is turned off, the output switching circuit 17a outputs the transmission data to the resistor R1. A current flowing in the resistor R1 is changed in accordance with a voltage output from the output switching circuit 17a. Thus, a potential of the second terminal 12 is also changed in accordance with H/L of the transmission data. As a result, the transmission data is superimposed as a data signal on the output signal.

When the switch SW is turned on, the output switching circuit 17a outputs the transmission data to the base terminal of the transistor TR1. The transistor TR1 enters an ON or OFF state in accordance with H/L of the transmission data. At this time, a current flowing in the diode D3 is changed in accordance with H/L of the transmission data. Thus, a potential of the second terminal 12 is also changed in accordance with H/L of the transmission data. As a result, the transmission data is superimposed as a data signal on the output signal. The electric apparatus 6 outputs a superimposed signal which is a signal in which the output signal and the data signal are superimposed from the second terminal 12.

Figure 5:
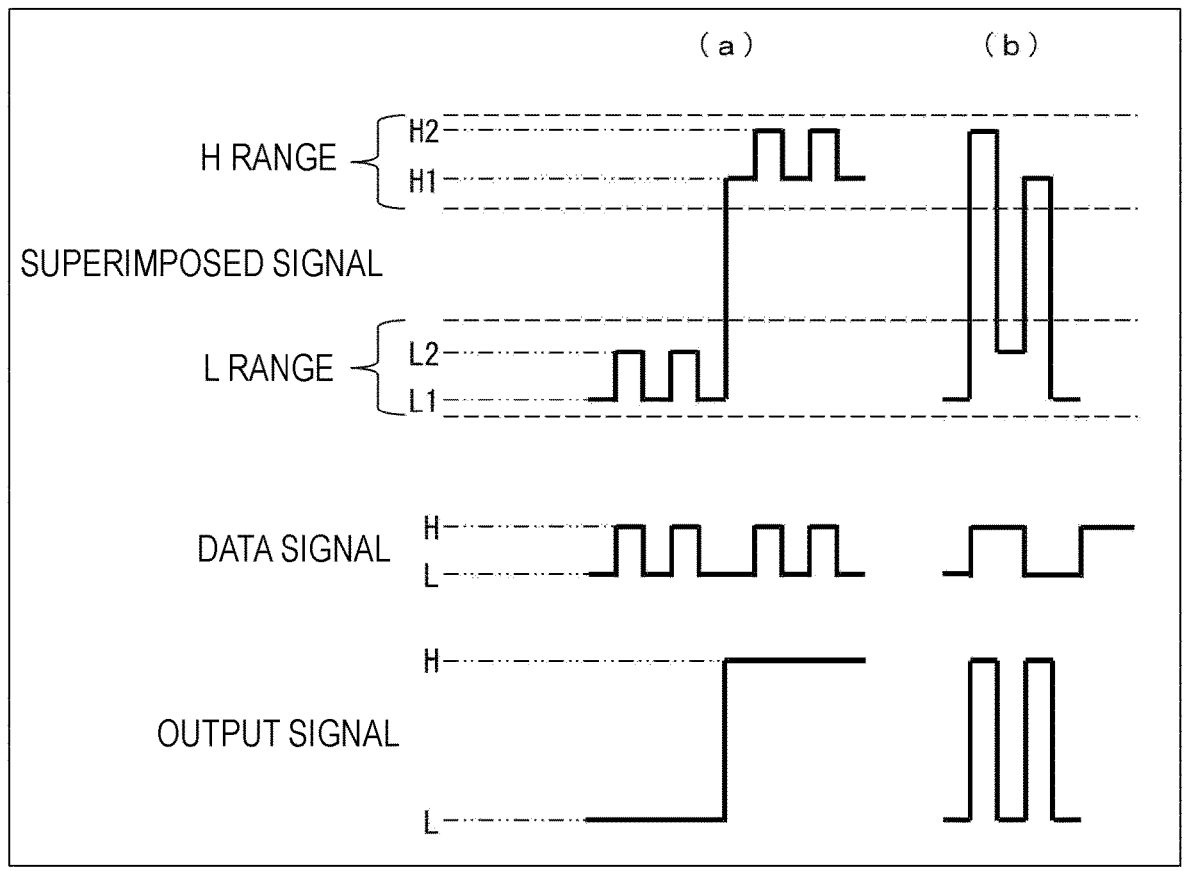
FIG. 5 is a diagram schematically illustrating examples of signal waveforms.

FIG. 5 is a diagram schematically illustrating examples of signal waveforms. In FIG. 5, (a) indicates a case in which a period of an output signal is longer than a period of the data signal and (b) indicates a case in which the period of the output signal is shorter than the period of the data signal. A signal in which the output signal and the data signal are superimposed is a superimposed signal. The waveform of the superimposed signal is a waveform in which a waveform of the output signal and the waveform of the data signal are superimposed. The amplitude of the output signal is greater than the amplitude of the data signal. Therefore, from the superimposed signal, a value of the original output signal and a value of the data signal can be ascertained. When the switch SW is turned on, the output signal becomes H. When the switch SW is turned off, the output signal becomes L.

The value of the superimposed signal can be divided into L1, L2, H1, and H2 from a lowest value. When the superimposed signal is within an L range, the output signal is in L. The L range includes L1 and L2. When the superimposed signal is within an H range greater than the L range, the output signal is in H. The H range includes H1 and H2. When the superimposed signal is L1 or H1, the data signal is in L. When the superimposed signal is L2 or H2, the data signal is in H.

The input unit 4 receives the superimposed signal from the electric apparatus 6 from the second input terminal 32.

The input circuit 33 determines whether the output signal is in the H or L (the switch SW is turned on or off) from the superimposed signal and outputs a determination result to the unit control circuit 36. Specifically, the detection circuit 33a outputs the determination result. The extraction circuit 34 extracts the data signal from the superimposed signal via the capacitor C21 and outputs the data signal to the error detection circuit 35. Specifically, the operational amplifier AMP21 outputs the data signal (transmission data). The diode D21 sets a threshold voltage used for the operational amplifier AMP21 to determine whether the data signal is in the H or L.

The resistors R41 to R42, the diode D41, and the transistor TR41 configure a constant current circuit. The constant current circuit limits a current input to the second input terminal 32. The constant current circuit sets the amplitude of the output signal output by the electric apparatus 6. Although the resistor R41 is used instead of the constant current circuit, the resistor R41 functions similarly.

Advantageous Effects

In the electric apparatus 6, the transmission circuit 15 operates using a voltage of a pair of signal lines 21 and 22 for transmitting the output signal as a power source. The transmission circuit 15 can generate a data signal indicating information different from the output signal indicating a state of the operation element 13 and transmit the data signal to the input unit 4. Therefore, it is not necessary to provide another power source operating the transmission circuit 15 in the electric apparatus 6 and it is not necessary to connect another wire for supplying a power source to the electric apparatus 6. Therefore, the electric apparatus 6 can transmit the output signal and the data signal using a wire (a pair of signal lines 21 and 22) smaller than in an electric apparatus of the related art. In the example of the embodiment, wires connected from the outside to the electric apparatus 6 are only the pair of signal lines 21 and 22.

The transmission circuit 15 operates at a voltage occurring between both ends of the potential difference generation circuit 14 connected to the operation element 13 in series. Therefore, irrespective of the state of the operation element 13 (when the switch SW is turned on and off), the transmission circuit 15 can transmit the data signal to the input unit 4. The input unit 4 can transmit the data signal (transmission data) to an upstream apparatus (the controller 3 or the PC2).

The electric apparatus 6 transmits an output signal with a potential corresponding to ON or OFF of the switch SW. Therefore, unlike a technology of the related art (IO-Link) for converting an ON-OFF signal into digital communication data, information regarding ON-OFF of the switch SW can be delivered to the input unit 4, the controller 3, and the PC 2 promptly. Since it is not necessary to convert the ON-OFF signal into the communication data, circuits of the electric apparatus 6 and the input unit 4 can be miniaturized and simplified.

When the electric apparatus 6 includes the diagnostic circuit 19, the PC 2 or the controller 3 can detect an abnormality occurring in the electric apparatus 6 from diagnostic data included in the transmission data. When the electric apparatus 6 is still running normally, the PC 2 can detect a failure sign of the electric apparatus 6 from the diagnostic data (for example, a switching speed of ON or OFF of the switch SW, or the like). The PC 2 informs a user of the detected abnormality (including a failure sign) by display/sound. Thus, the user can exchange the electric apparatus 6 before a manufacturing line is stopped abnormally.

When the electric apparatus 6 does not include the diagnostic circuit 19, the communication system 1 can detect an abnormality as follows. For example, when an abnormality which cannot be detected on the side of the controller 3 occurs in ON or OFF of the limit switch (the electric apparatus 6), the PC 2 or the controller 3 can determine whether an abnormality (disconnection or short-circuiting) has occurred in the signal lines 21 and 22 or whether an abnormality has occurred in the electric apparatus 6. The electric apparatus 6 transmits an identifier of the electric apparatus 6 as the transmission data to the input unit 4 periodically (continuously). For example, when the identifier cannot be received, the PC 2 or the controller 3 may determine that there is an abnormality in the signal lines 21 and 22. When the identifier can be received and ON or OFF of the limit switch (the electric apparatus 6) cannot be detected, the PC 2 or the controller 3 may determine that there is an abnormality in the electric apparatus 6. The PC 2 can inform information indicating where there is an abnormality of the user by display or sound. Thus, the user can quickly prepare for and perform recovery work, and thus it is possible to shorten a time at which the manufacturing line is stopped.

Second Embodiment

Another embodiment related to an aspect of the present disclosure will be described. To facilitate description, the same reference numerals are given to members that have the same functions as the members described in the first embodiment, and description thereof will not be repeated.

§ 1 Application Examples

Figure 6:
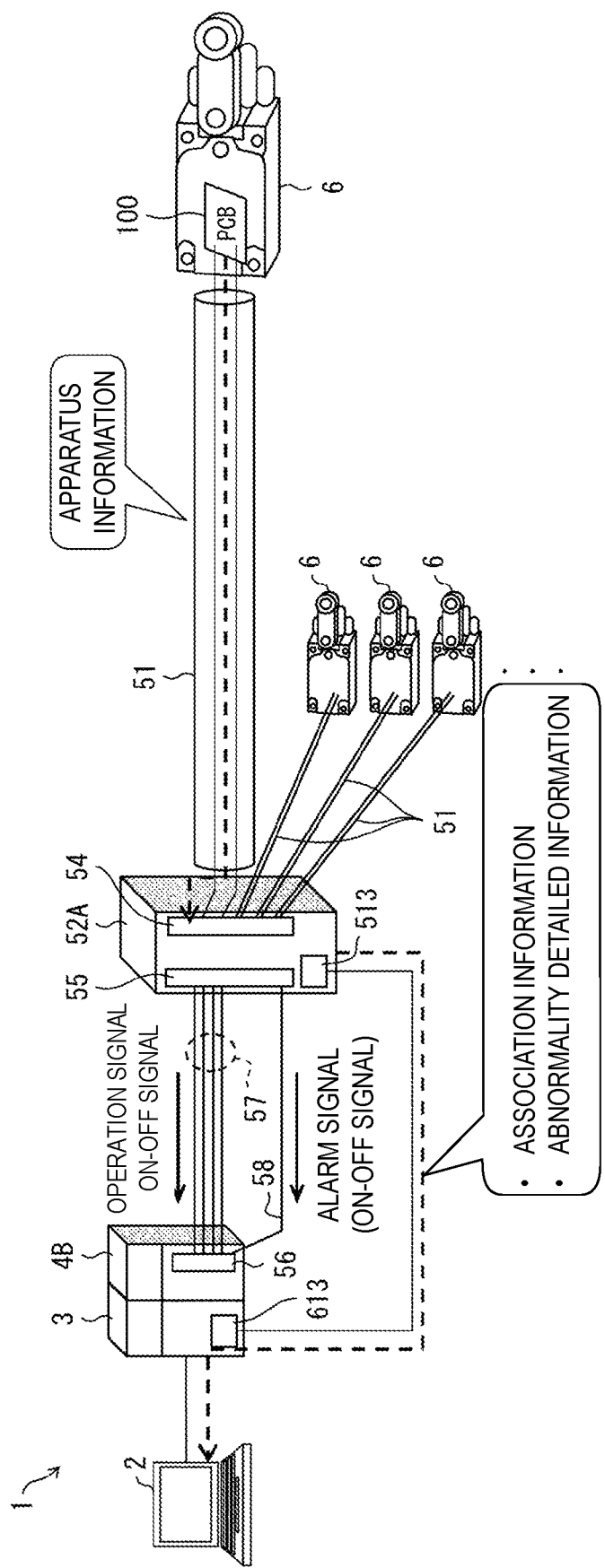
FIG. 6 is a diagram schematically illustrating an example of an application scenario of a signal processing device according to an aspect of the present disclosure.

FIG. 6 is a diagram schematically illustrating an example of an application scenario of a signal processing device 100 according to an aspect of the present disclosure. The communication system 1 may include the personal computer 2 (a PC or an information processing device), the controller 3 (an apparatus control device), an input unit (an apparatus control device), and one electric apparatus or the plurality of electric apparatuses 6 to 10 as in the first embodiment, and may include the output unit 5 (not illustrated). Hereinafter, the plurality of electric apparatuses 6 to 10 is collectively referred to as the electric apparatus 6. Description of the electric apparatus 6 applies to electric apparatuses 7 to 10.

A difference from the first embodiment is that an input unit does not correspond to superimposed signal communication in the communication system 1. Hereinafter, an input unit that does not correspond to superimposed signal communication is referred to as an input unit 4B. The input unit 4B cannot receive a superimposed signal or cannot extract a data signal from a superimposed signal even when the superimposed signal can be received. Depending on a case, the input unit 4B may be able to handle a superimposed signal as an ON-OFF signal regarding an operation element of the electric apparatus 6 even when the superimposed signal is received.

In the embodiment, the controller 3 is connected to the input unit 4B and can control or monitor the electric apparatus 6 by receiving a signal related to the electric apparatus 6 from the input unit 4B. The controller 3 configures an apparatus control device controlling or monitoring the electric apparatus 6 along with the input unit 4B. In another example, the controller 3 may be integrated with the input unit 4B and an apparatus control device may be configured as one unit.

In the embodiment, a signal processing device 100 that processes the superimpose signal is provided in the electric apparatus 6. Thus, the electric apparatus 6 is introduced as an apparatus corresponding to the superimposed signal communication in the communication system 1.

In the embodiment, to deliver information regarding the electric apparatus 6 corresponding to the superimposed signal communication from the input unit 4B which does not correspond to the superimposed signal communication in the communication system 1 to various upstream devices, a master module 52A for the superimposed signal communication is provided.

The master module 52A includes a downstream communication port group 54 (a plurality of first communication ports) electrically connecting one electric apparatus 6 or the plurality of electric apparatuses 6 via a communication cable 51. The master module 52A can receive a superimposed signal from each electric apparatus 6 via each communication port (the first communication port) of the downstream communication port group 54 and can handle a data signal related to the electric apparatus 6 and an ON-OFF signal of the electric apparatus 6. The master module 52A includes an upstream communication port group 55 (a plurality of second communication ports) configured by a plurality of communication ports for inputting various kinds of information related to each electric apparatus 6 to the input unit 4B.

It is assumed that the same values can be allocated by causing bit values (port identification information) allocated to the communication ports of the downstream communication port group 54 and bit values allocated to the communication ports (the second communication ports) of the upstream communication port group 55 to have one-to-one correspondence. For example, when a signal is input from the electric apparatus 6 via a communication port with a bit value of "00" in the downstream communication port group 54, a signal corresponding to the above-described input signal is output and destined for the input unit 4B from the communication port with the bit value of "00" in the upstream communication port group 55.

The upstream communication port group 55 is connected to the communication port group 56 (the plurality of third communication ports) of the input unit 4B via a plurality of signal lines. For example, as the plurality of signal lines, a signal line group 57 (the plurality of first signal lines) and a signal line 58 (the second signal line) are assumed. For wires of the signal line group 57, signal lines of the signal line group 57 are connected to have one-to-one correspondence with the plurality of electric apparatuses 6. That is, the electric apparatuses 6, the communication ports of the downstream communication port group 54, the communication ports of the upstream communication port group 55, the signal lines of the signal line group 57, and the communication ports of the communication port group 56 of the input unit 4B are connected to have one-to-one correspondence.

Thus, the input unit 4B and the controller 3 can ascertain the electric apparatus 6 for which a signal is input in accordance with a communication port of the communication port group 56 in the input unit 4B from which the signal is input.

As necessary, apart from the signal line group 57, the signal line 58 may be provided between the upstream communication port group 55 of the master module 52A and the communication port group 56 of the input unit 4B. For example, when an abnormality has occurred in any of the electric apparatuses 6, the signal line 58 is used to input an alarm signal for notifying of the occurrence of the abnormality from the master module 52A to the input unit 4B.

As necessary, the master module 52A may include a communication unit 513 (second communication unit). The communication unit 513 performs communication with an external device such as the PC 2 or the controller 3 in conformity with a predetermined communication standard. The communication unit 513 is configured by a plurality of various communication interfaces such as communication ports to realize communication with an external device. The communication unit 513 may perform communication with a wired line realized by Ethernet (registered trademark), RS485, or the like or may perform communication with a wireless line realized by Wi-Fi (registered trademark), 4G, or the like. The communication unit 513 is connected to be able to communicate with a communication unit 613 (first communication unit) of the controller 3 and the master module 52A can supply various kinds of information obtained from each electric apparatus 6 to the controller 3. As the various kinds of information, for example, apparatus information for identifying the electric apparatus 6, association information for uniquely managing the electric apparatus 6 on the network of the communication system 1, abnormality information indicating information related to an abnormality occurring in the electric apparatus 6, and the like are assumed. In this way, although the input unit 4B does not correspond to superimposed signal communication, various kinds of information carried and transmitted on a superimposed signal are subjected to a necessary process so that the information can be processed by the controller 3 as necessary and are supplied from the input unit 4B to various upstream devices by another means.

With the above-described configuration, when the electric apparatus 6 performing the superimposed signal communication is introduced to the communication system 1, the input unit 4B which does not correspond to the superimposed signal communication can be used, as described above, and the electric apparatus 6 can be monitored or controlled in the controller 3 or the PC 2.

Hereinafter, four examples will be described as configuration examples (1) to (4) as the configuration of the communication system 1 enabling the input unit 4B which does not correspond to the superimposed signal communication to monitor or control the electric apparatus 6 which corresponds to the superimposed signal communication.

First, terms used to describe each configuration example below are defined here:

abnormality information that is general information regarding an occurring abnormality provided by the master module 52A to the controller 3 (the input unit 4B) which does not correspond to the superimposed signal communication when an abnormality has occurred in the electric apparatus 6;

an abnormality occurrence notification that is a notification for informing the controller 3 that an abnormality has occurred in any of the electric apparatuses 6 in the above-described abnormality information, and the controller 3 can detect occurrence of an abnormality by receiving the abnormality occurrence notification;

abnormality detailed information that is information including first information specifying the electric apparatus 6 in which an abnormality has occurred and second information indicating content of the occurring abnormality in the above-described abnormality information, and the controller 3 can specify the electric apparatus 6 in which an abnormality has occurred based on the first information and can specify the content of the occurring abnormality based on the second information;

an operation signal that is an ON-OFF signal indicating a state of the operation element 13 of the electric apparatus 6;

a data signal that is an ON-OFF signal indicating predetermined information regarding the electric apparatus 6, and apparatus information for identifying the electric apparatus 6, status information indicating an abnormal state of the electric apparatus 6, and the like are assumed as specific examples of the predetermined information;

a superimposed signal that is a signal in which a data signal is superimposed on an operation signal;

an alarm signal that is an ON-OFF signal handled as the above-described abnormality occurrence notification in the controller 3 and is provided from the master module 52A to the controller 3 (the input unit 4B) via the signal line 58;

a report signal that is an ON-OFF signal handled as serial data indicating abnormality detailed information in the controller 3 and is provided from the master module 52A to the controller 3 (the input unit 4B) via the signal line 58 as in the alarm signal; and association information that is information indicating a correspondent relation between the apparatus information identifying the electric apparatus 6 and a bit value allocated to the communication port to which the electric apparatus 6 is connected.

Next, before each configuration example is described, a network configuration which is common to the four configuration examples and is assumed in the communication system 1 will be described with reference to FIGS. 7 and 8.

Here, in the following description, an example of the configuration of the communication system 1 including the master module 52A according to the present disclosure will be described merely. There is no limitation to the master module 52A which is connected to a network. As another example, the master module 52A may be connected to the controller 3 without being involved in a network. That is, the master module 52A is connected to a system bus of the controller 3 and the master module 52A that has a superimposed communication function is also within a scope of the present invention.

Figures 7, 8:
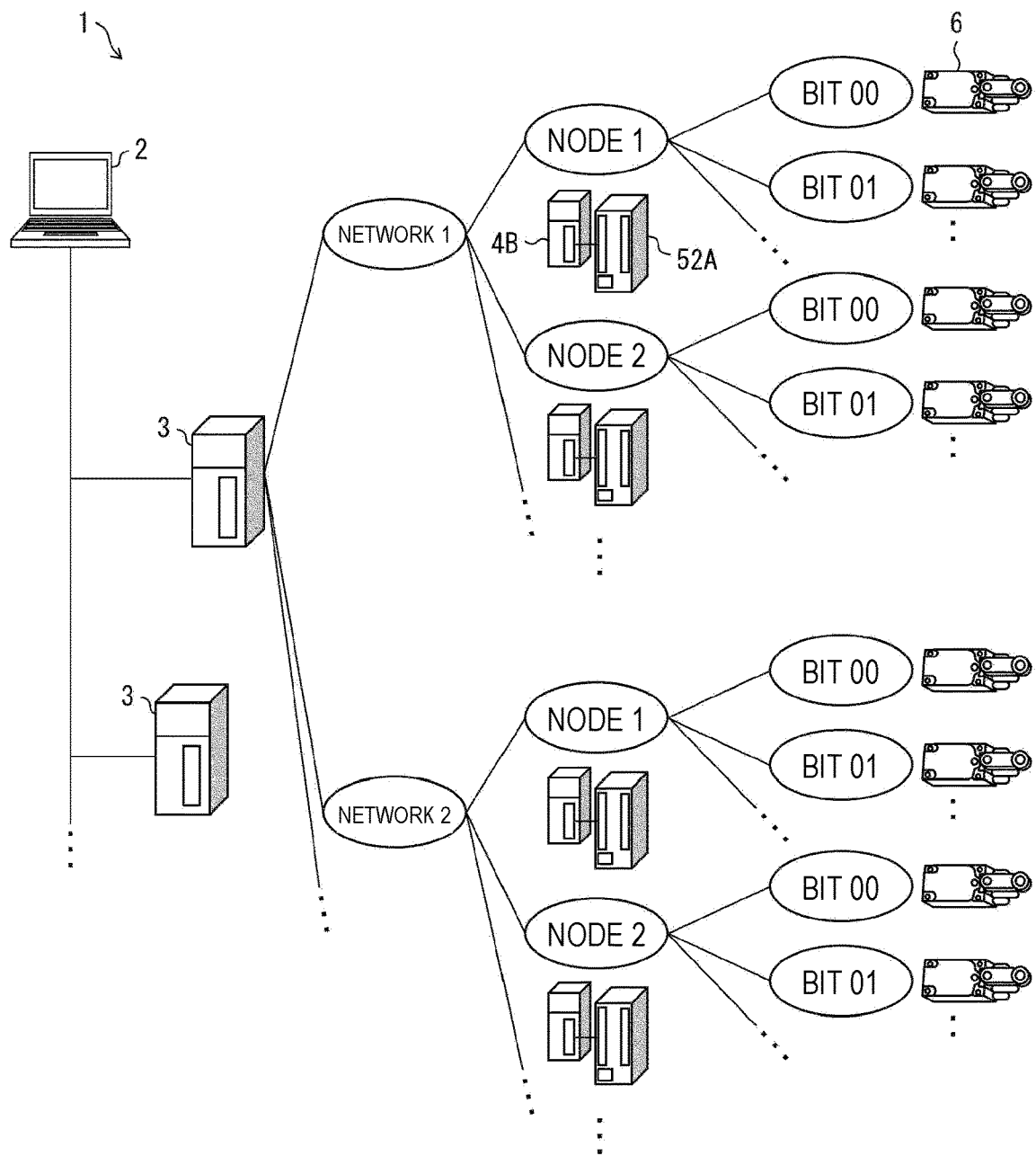
FIG. 7 is a diagram illustrating an example of a network configuration constructed in a communication system to which a signal processing device and a master module are applied according to an aspect of the present disclosure.
FIG. 8 is a diagram illustrating an example of a data structure of address information managed by a network of the communication system according to an aspect of the present disclosure.

FIG. 7 is a diagram illustrating an example of a network configuration constructed in the communication system 1 to which the signal processing device 100 and the master module 52A are applied.

FIG. 8 is a diagram illustrating an example of a data structure of address information managed by a network of the communication system 1.

As described in FIG. 7, in the communication system 1, the PC 2 is connected to be able to communicate with one controller 3 or the plurality of controllers 3. When the PC 2 communicates with the plurality of controllers 3, the PC 2 identifies the controller 3 which is a communication partner based on identification information unique to the controller 3 (hereinafter referred to as a controller ID).

The controller 3 may be connected to one network or a plurality of networks. The controller 3 is connected to be able to communicate with one input unit 4B or the plurality of input units 4B via one network. As described above, the input unit 4B is connected to have one-to-one correspondence with the master module 52A via the signal line group 57 and the signal line 58, as described above. That is, the controller 3 is connected to be able to communicate with one master module 52A and the plurality of master modules 52A via one network.

When the controller 3 is connected to the plurality of networks, each network is identified based on identification information unique to each network (hereinafter referred to as a network ID). When the controller 3 communicates with the plurality of input units 4B via one network, the input unit 4B which is a communication partner is identified based on identification information (hereinafter referred to as a node ID) allocated to each input unit 4B managed in a node on the network. Specifically, the controller 3 ascertains a correspondent relation between the node ID and a unit ID for identifying a pair of input unit 4B and master module 52A. The controller 3 specifies the node ID based on the unit ID of the pair of master module 52A and input unit 4B which is a communication partner and can deliver the node ID to an upstream device (for example, the PC 2) as part of address information of the input unit 4B on the network.

The master module 52A connected to the input unit 4B in a one-to-one manner is connected to be able to communicate with the plurality of electric apparatuses 6 via the plurality of communication ports (the downstream communication port group 54) of the own device and the communication cable 51. The master module 52A identifies the electric apparatus 6 which is a communication partner, more accurately, the signal processing device 100 provided in the electric apparatus 6, based on a bit value individually allocated to each communication port of the downstream communication port group 54. Specifically, the master module 52A ascertains a correspondent relation between the electric apparatus 6 (the signal processing device 100) and the bit value of the connected communication port. The master module 52A can specify the communication port through which a signal transmitted from the communication partner is input and can specify information regarding the electric apparatus 6 indicated by the signal based on the bit value of the communication port. The master module 52A can deliver the above-described bit value as part of the address information of the electric apparatus 6 on the network to an upstream device (for example, the controller 3).

As described in FIG. 8, the PC 2 can individually identify all the electric apparatuses 6 belonging to the communication system 1 governed by the PC 2 based on address information including a controller ID of the controller 3, a network ID, a node ID delivered downstream, and a bit value, and can specify a location on the network.

§ 2 Configuration Example (1)

In a configuration example (1), the master module 52A separates the data signal and the operation signal from the superimposed signal supplied from the electric apparatus 6 and inputs the operation signal to the input unit 4B via a signal line corresponding to the electric apparatus 6 in the signal line group 57. In the configuration example, even the input unit 4B which receives the superimposed signal and cannot recognize ON or OFF as an operation signal can be used, as described above, in the communication system 1 using the superimposed signal communication. Specifically, in the configuration example, although the superimposed signal is input to the input unit 4B, the superimposed signal exceeds ON or OFF thresholds of a voltage and a current set in the input unit 4B. Therefore, when ON or OFF cannot be correctly input as the operation signal to the input unit 4B, appropriate adaptation can be achieved.

[Hardware Configuration]

Figure 9:
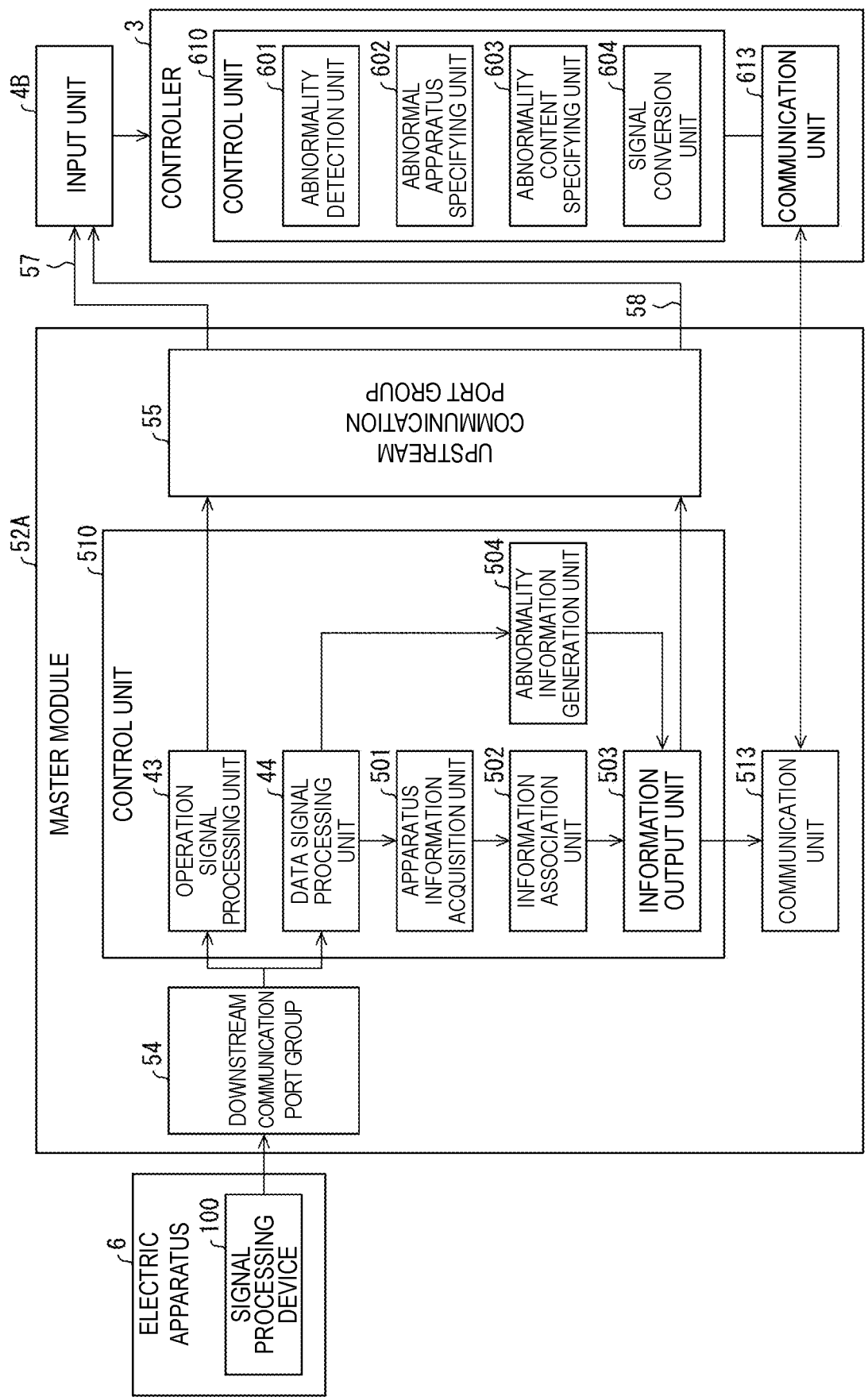
FIG. 9 is a block diagram illustrating configurations of the master module and a controller according to an aspect of the present disclosure.

FIG. 9 is a block diagram illustrating configurations of the master module 52A and the controller 3 according to an aspect of the present disclosure. As illustrated in the drawing, it is assumed that the master module 52A corresponds to communication in which the superimposed signal is used as in the input unit 4 and the output unit 5 of the first embodiment. It is assumed that the input unit 4B does not correspond to the communication in which the superimposed signal is used.

Figure 10:
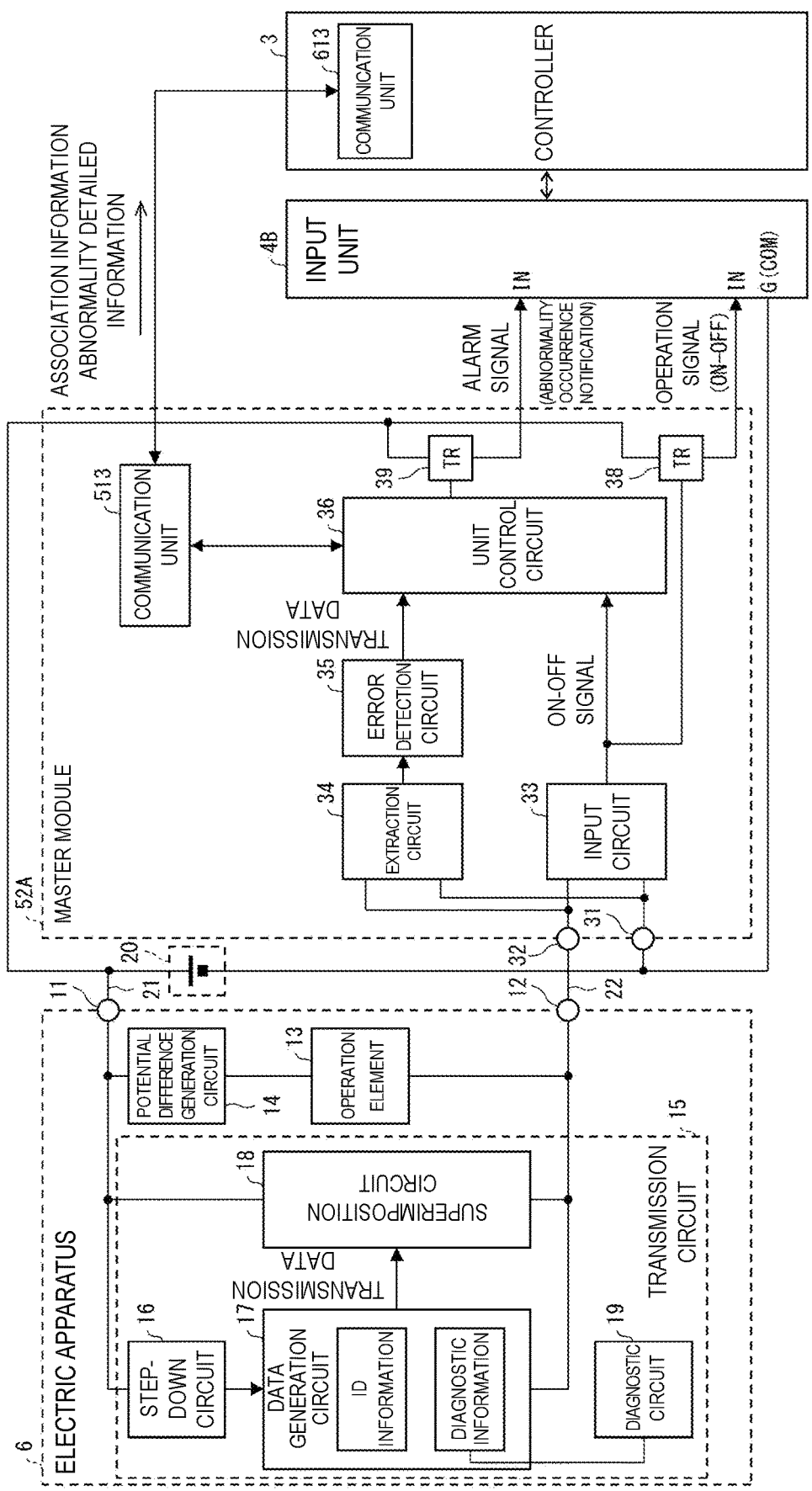
FIG. 10 is a block diagram illustrating a circuit configuration of the master module according to a configuration example (1) which is an aspect of the present disclosure.

FIG. 10 is a block diagram illustrating a circuit configuration of the master module 52A according to the configuration example (1) which is an aspect of the present disclosure.

<Electric Apparatus 6 and Signal Processing Device 100>

As illustrated in FIG. 9, in the configuration example, the signal processing device 100 is provide in each electric apparatus 6 and has a configuration similar to that of the signal processing device 100 described in the first embodiment.

In the embodiment, the information storage unit 140 of the signal processing device 100 stores predetermined information regarding the electric apparatus 6. The predetermined information is, for example, apparatus information for identifying the electric apparatus 6. A data structure of the apparatus information will be described in detail below.

In another embodiment, the signal processing device 100 may be embedded in a cable casing that has an external appearance with a communication cable shape. In this case, one end of the cable casing is connected to the electric apparatus 6 and an operation signal of the electric apparatus 6 can be acquired by the signal processing device 100. The other end of the cable casing is connected to the master module 52A and the superimposed signal in which the data signal indicating the predetermined information regarding the electric apparatus 6 is superimposed on the operation signal of the electric apparatus 6 is transmitted from the signal processing device 100 to the master module 52A.

As illustrated in FIG. 10, the electric apparatus 6 has a circuit configuration similar to the circuit configuration of the electric apparatus 6 described with reference to FIG. 1.

<Master Module 52A>

The master module 52A supplies association information indicating a correspondent relation between the electric apparatus 6 and the communication port connected to the electric apparatus 6 to each upstream device, processes the superimposed signal related to the electric apparatus 6 and supplied from the signal processing device 100, and outputs the processed signal to the input unit 4B in a form which can be processed by the input unit 4B.

As illustrated in FIG. 9, in the configuration example, the master module 52A includes, for example, a control unit 510 and a communication unit 513 (second communication unit).

The control unit 510 generally controls each unit of the master module 52A. The control unit 510 may be, for example, a processor that performs a command of a program. As the processor, for example, a central processing unit (CPU), an MPU, or the like can be used. The control unit 510 includes blocks of an operation signal processing unit 43, a data signal processing unit 44, an apparatus information acquisition unit 501, an information association unit 502, an information output unit 503, and an abnormality information generation unit 504. Each of the above-described units indicated as the blocks may be realized, for example, by causing the CPU or the MPU to read a program stored in a storage device such as a read-only memory (ROM) to a random access memory (RAM) or the like and execute the program.

As illustrated in FIG. 10, as a configuration of a circuit controlled by each unit of the control unit 510, the master module 52A has, for example, at least a part of the circuit configuration of the input unit 4 illustrated in FIG. 1. That is, the master module 52A includes a first input terminal 31, a second input terminal 32, an input circuit 33, an extraction circuit 34, an error detection circuit 35, and a unit control circuit 36. Further, in the configuration example, the master module 52A includes transistors 38 and 39.

The transistor 38 controls a flow of electricity supplied from the input circuit 33 and output to the communication port group 56 of the input unit 4B in accordance with ON or OFF of the operation signal related to the electric apparatus 6.

The transistor 39 outputs an alarm signal for notifying of occurrence of an abnormality to the input unit 4B by controlling the flow of electricity output to the communication port group 56 of the input unit 4B in response to an output of the data signal related to occurrence of an abnormality of the electric apparatus 6 from the unit control circuit 36.

<Controller 3>

The controller 3 controls each electric apparatus 6 by transmitting an operation signal to each electric apparatus 6 via an output unit (not illustrated) and receives an ON-OFF signal related to each electric apparatus 6 via the input unit 4B and monitors each electric apparatus 6. Further, in the configuration example, the controller 3 communicates with the master module 52A via the communication unit 613 (first communication unit) and monitors each electric apparatus 6 based on the association information and the abnormality information received from the master module 52A.

In the configuration example, the controller 3 is typically a programmable logic controller (PLC) controlling control targets such as a machine, a facility, and the like. The controller 3 includes, for example, a control unit 610 and the above-described communication unit 613.

The control unit 610 generally controls each unit of the controller 3. The control unit 610 may be, for example, a processor that performs a command of the program. As the processor, for example, a central processing unit (CPU), an MPU, or the like can be used. In the configuration example, the control unit 610 includes blocks of an abnormality detection unit 601, an abnormal apparatus specifying unit 602, and an abnormality content specifying unit 603. In the configuration example, the control unit 610 does not include a signal conversion unit 604. Each of the above-described units indicated as the blocks may be realized, for example, by causing the CPU or the MPU to read a program stored in a storage device such as a read-only memory (ROM) to a random access memory (RAM) or the like and execute the program.

The communication unit 613 performs communication in conformity with a predetermined communication standard with an external device such as the master module 52A or the PC 2. The communication unit 613 is configured by various communication interfaces, such as communication ports, necessary to realize communication with the external device. The communication unit 613 may perform communication with a wired line realized by Ethernet (registered trademark), RS485, or the like or may perform communication with a wireless line realized by Wi-Fi (registered trademark), 4G, or the like.

[Functional Configuration]
<Master Module 52A>

The operation signal processing unit 43 illustrated in FIG. 9 detects an operation signal related to an operation of the electric apparatus 6 from the superimposed signal supplied from the signal processing device 100 of the electric apparatus 6. The operation signal processing unit 43 operates the input circuit 33, detects an operation signal, and transmits the detected operation signal to the unit control circuit 36. The operation signal is input to the input unit 4B via the unit control circuit 36 and the communication port corresponding to the electric apparatus 6 in the upstream communication port group 55.

The data signal processing unit 44 extracts the data signal from the superimposed signal supplied from the signal processing device 100 of the electric apparatus 6. The data signal processing unit 44 operates the extraction circuit 34 to extract the data signal, operates the error detection circuit 35 as necessary to detect an error, and subsequently transmits the data signal to the unit control circuit 36. The data signal supplied from the electric apparatus 6 is assumed to include, for example, apparatus information for identifying the electric apparatus 6 and status information indicating an abnormal state of the electric apparatus 6. The units located downstream, for example, the apparatus information acquisition unit 501, the information association unit 502, and the information output unit 503, operate the unit control circuit 36 and process various kinds of information regarding the electric apparatuses 6 included in the data signal.

The apparatus information acquisition unit 501 acquires the apparatus information unique to the electric apparatus 6 and included in the data signal.

The information association unit 502 associates the bit value allocated to the communication port through which the superimposed signal is received in the downstream communication port group 54 with the apparatus information acquired from the superimposed signal by the apparatus information acquisition unit 501 to generate association information indicating a correspondent relation between the bit value and the apparatus information. The data structure of the association information will be described in detail below.

The abnormality information generation unit 504 generates abnormality information and supplies the abnormality information to the controller 3 when an abnormality has occurred in the electric apparatus 6. As an example of the abnormality information, the abnormality information generation unit 504 generates an abnormality occurrence notification which is a notification for informing the controller 3 of occurrence of an abnormality. As another example of the abnormality information, the abnormality information generation unit 504 generates abnormality detailed information indicating detailed information regarding the occurring abnormality. Specifically, the abnormality detailed information includes first information for specifying the electric apparatus 6 in which an abnormality has occurred and second information indicating content of the abnormality occurring in the electric apparatus 6.

For example, the abnormality information generation unit 504 acquires the data signal processed by the data signal processing unit 44 and transmitted to the unit control circuit 36. When the data signal includes the status information indicating an abnormal state of the electric apparatus 6, the abnormality information generation unit 504 generates at least one of the abnormality occurrence notification and the abnormality detailed information based on the status information.

Specifically, the abnormality information generation unit 504 operates the unit control circuit 36 and the transistor 39 to generate an alarm signal processed as the abnormality occurrence notification. The alarm signal is processed as the abnormality occurrence notification by the controller 3.

Specifically, the abnormality information generation unit 504 acquires the bit value of the communication port to which the data signal is input or apparatus information associated with the bit value as the first information. The abnormality information generation unit 504 acquires the content of the abnormality which has occurred in the electric apparatus 6 and is indicated by the status information as the second information. The abnormality information generation unit 504 generates the abnormality detailed information including the first information and the second information. The abnormality detailed information generated by the abnormality information generation unit 504 is processed by the information output unit 503.

As another example, the abnormality information generation unit 504 may detect disconnection abnormality or the like of the communication cable 51 based on a normal superimposed signal which cannot be received from the electric apparatus 6 over a given time or more in reception circuits such as the input circuit 33 and the extraction circuit 34 in the master module 52A. In this case, the abnormality information generation unit 504 generates one of the abnormality occurrence notification and the abnormality detailed information based on the normal superimposed signal which cannot be received from the electric apparatus 6 for the given time or the like.

The abnormality information generation unit 504 may generate the alarm signal processed as the abnormality occurrence notification similarly to the previous example.

The abnormality information generation unit 504 may acquire the bit value of the communication port through which the abnormality superimposed signal is not received for a given time or the apparatus information associated with the bit value as the first information. The abnormality information generation unit 504 may generate the second information indicating disconnection abnormality or the like.

The information output unit 503 outputs the association information or the abnormality information so that the association information generated by the information association unit 502 or the abnormality information generated by the abnormality information generation unit 504 is supplied to various upstream devices, for example, the controller 3 or the PC 2. In the configuration example, the information output unit 503 operates the transistor 39 to transmit the alarm signal which is the abnormality occurrence notification to the input unit 4B (the controller 3) via the signal line 58. The information output unit 503 transmits the association information or the abnormality detailed information in the abnormality information to the controller 3 via the communication unit 513 in, for example, Ethernet communication.

As described above, the master module 52A can also detect an abnormality spontaneously based on the fact that a signal is not delivered from the electric apparatus 6 in addition to detection of the abnormality based on a notification explicitly delivered from the electric apparatus 6. In any case, the master module 52A can generate an abnormality information regarding the detected abnormality and inform the abnormality information to various upstream devices.

<Controller 3>

The abnormality detection unit 601 detects that an abnormality has occurred in the electric apparatus 6 belonging to the communication system 1. In the configuration example, for example, the abnormality detection unit 601 detects that the abnormality has occurred based on the alarm signal input to the input unit 4B via the signal line 58 by the information output unit 503 of the master module 52A. In the configuration example, when the abnormality detection unit 601 detects that the abnormality has occurred, the communication unit 613 is controlled to request the master module 52A to transmit the abnormality detailed information.

The abnormal apparatus specifying unit 602 specifies the electric apparatus 6 in which the abnormality detected by the abnormality detection unit 601 has occurred. In the configuration example, the abnormal apparatus specifying unit 602 specifies the electric apparatus 6 in which the abnormality has occurred based on the abnormality detailed information received from the master module 52A by the communication unit 613. For example, when the bit value is included as the first information of the abnormality detailed information, the abnormal apparatus specifying unit 602 can specify the electric apparatus 6 in which the abnormality has occurred based on the above-described bit value with reference to the association information received in advance from the master module 52A. Alternatively, when the apparatus information is included as the first information, the abnormal apparatus specifying unit 602 can specify the electric apparatus 6 in which the abnormality has occurred based on the apparatus information.

The abnormality content specifying unit 603 specifies content of the abnormality occurring in the electric apparatus 6. In the configuration example, for example, the abnormality content specifying unit 603 specifies the content of the abnormality based on the second information included in the above-described abnormality detailed information received by the communication unit 613.

[Data Structure]

Figure 11:
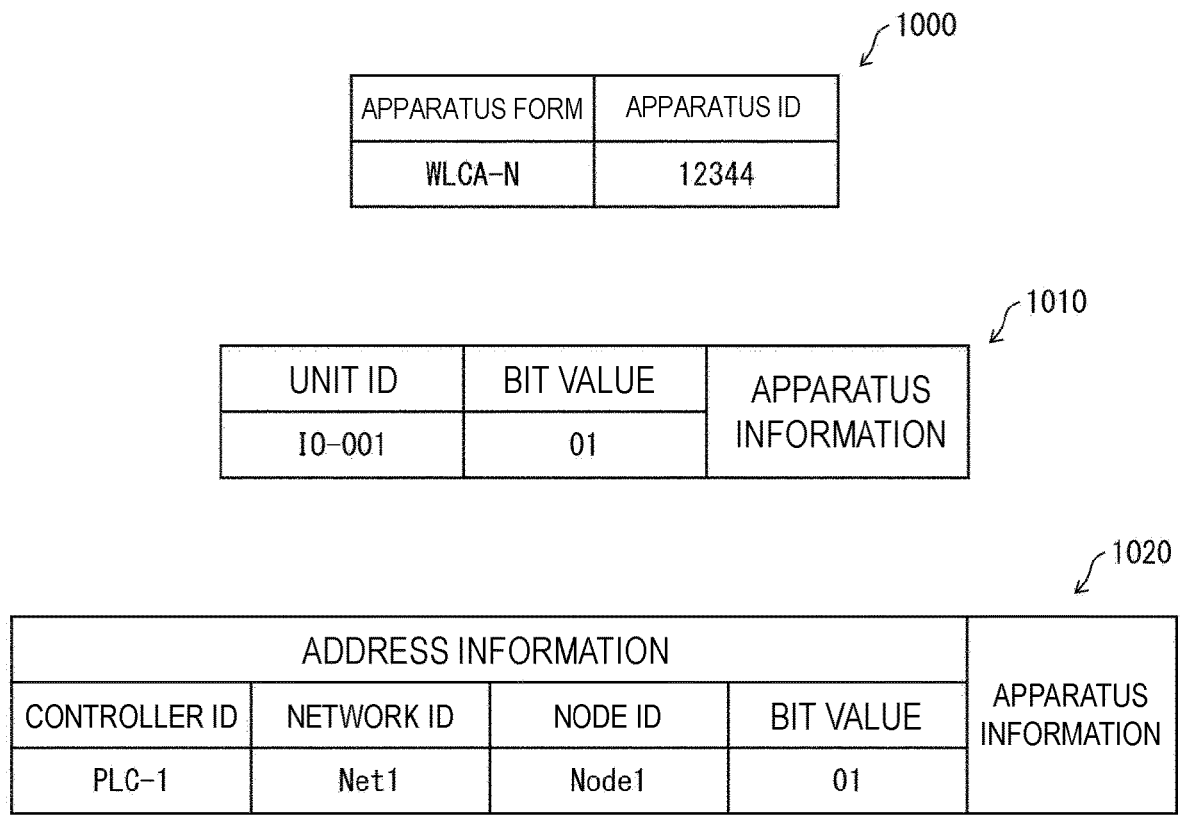
FIG. 11 is a diagram illustrating a data structure of information processed in each device belonging to the communication system according to an aspect of the present disclosure.

FIG. 11 is a diagram illustrating a data structure of information processed in each device belonging to the communication system 1, in particular, the master module 52A and the controller 3. A table denoted by reference numeral 1000 indicates an example of a data structure of the apparatus information. Hereinafter, as necessary, the table is referred to as the apparatus information 1000. A table denoted by reference numeral 1010 indicates an example of a data structure of the association information. Hereinafter, as necessary, the table is referred to as association information 1010. A table denoted by reference numeral 1020 indicates an example of a record registered in a database to be described below with reference to FIG. 12 and referred to by the controller 3 or the PC 2. Hereinafter, as necessary, the table is referred to as a record 1020.

<Apparatus Information>

The apparatus information 1000 is information including identification information unique to the electric apparatus 6. The apparatus information is configured by, for example, items of an apparatus format and an apparatus ID. In the item of the apparatus format, information indicating a format as a product of the electric apparatus 6 is stored. In the item of the apparatus ID, a serial number for uniquely identifying the electric apparatus 6 of this format is stored. The electric apparatus 6 is uniquely specified with the apparatus format and the apparatus ID.

For example, when an input terminal (not illustrated) such as a smartphone can be connected to the signal processing device 100 in the electric apparatus 6 via an information rewriting device (not illustrated) capable of writing information in the signal processing device 100, the apparatus information may further include an item of a maintenance date as an example. For example, the user can operate an input terminal to write the maintenance date of the electric apparatus 6 on the information storage unit 140 of the signal processing device 100. The user can store, for example, a latest date on which maintenance is performed on the electric apparatus 6 in the signal processing device 100 as necessary. In this case, an area in which the maintenance date is written in the information storage unit 140 may be configured by a user programmable ROM such as an electrically erasable programmable read-only memory (EEPROM) (registered trademark) on which writing can be performed from the input terminal, and an area in which the apparatus format and the apparatus ID of the electric apparatus 6 are stored may be configured by another EEPROM of the former and an EEPROM in which post-writing set in shipment or the like is prohibited.

After the apparatus information 1000 is extracted from the superimposed signal input via the communication cable 51 by the apparatus information acquisition unit 501 of the master module 52A, the apparatus information 1000 is used for the information association unit 502 to generate the association information.

<Association Information>

The association information is information indicating a correspondent relation between the bit value of the communication port and the electric apparatus 6. In the configuration example, the association information is generated by the information association unit 502 of the master module 52A and is supplied to the controller 3 via the communication unit 513. Thus, although the input unit 4B which does not correspond to the superimposed signal communication is used, the controller 3 can identify and monitor the electric apparatus 6.

In the embodiment, the bit value allocated to each communication port in the downstream communication port group 54 of the master module 52A, the bit value allocated to each communication port of the upstream communication port group 55, and the bit value allocated to each communication port of the communication port group 56 of the input unit 4B are the same value with respect to one connected electric apparatus 6.

Accordingly, when the operation signal is received via a certain communication port of the input unit 4B, the controller 3 can identify the electric apparatus 6 of which an operation signal is the received operation signal based on the association information.

More specifically, the association information has, for example, a configuration in which the unit ID and the bit value are added to the apparatus information 1000. The master module 52A receives the superimposed signal from the signal processing device 100 provided in the electric apparatus 6 via one communication port of the downstream communication port group 54. The data signal processing unit 44 extracts the data signal from the superimposed signal and the apparatus information acquisition unit 501 acquires the apparatus information from the data signal. The information association unit 502 associates the bit value allocated to the communication port through which the above-described superimposed signal is received with the above-described acquired apparatus information. Further, the information association unit 502 generates the association information by adding the unit ID of the master module 52A or the unit ID of the input unit 4B which has one-to-one correspondence with the master module 52A to a pair of bit value and apparatus information. The unit ID of the input unit 4B may be registered in advance in a storage unit (not illustrated) of the master module 52A. The information output unit 503 transmits the generated association information 1010 to the controller 3 via the communication unit 513 by, for example, Ethernet.

<Record>

The record 1020 is information generated by the controller 3 receiving the association information from the master module 52A. The record 1020 is generated by changing the format of the association information so that the controller 3 or the PC 2 manages the electric apparatus 6. When the generated record 1020 is registered in a database (a configuration table to be described below) for managing the electric apparatus 6, the controller 3 or the PC 2 can manage the electric apparatus 6 while using the input unit 4 which does not correspond to the superimposed signal communication.

The record 1020 has, for example, a configuration in which the address information illustrated in FIG. 8 is added to the apparatus information 1000. When the association information is received from the master module 52A, the controller 3 specifies a network ID of a network to which the master module 52A of a transmission source belongs and a node ID allocated to the master module 52A based on the unit ID included in the association information. The controller 3 generates the record 1020 by adding, to the apparatus information address, information that includes the controller ID of the own device, the specified network ID, and the node ID, and the bit value included in the association information. The controller 3 registers the generated record 1020 in the configuration table to be described below. When the configuration table is retained by the PC 2 in a form in which the controller 3 cannot have access, the controller 3 may transmit the generated record 1020 to the PC 2. In this case, the PC 2 registers the record 1020 in the configuration table.

<Configuration Table>

FIG. 12 is a diagram illustrating an example of a data structure of the configuration table. The configuration table is a database in which a plurality of records such as the record 1020 transmitted from each controller 3 is collected, is generated by, for example, the controller 3, and is managed by the PC 2. One configuration table may be shared between the PC 2 and the controller 3 or the configuration table which is each retained may be controlled and synchronized to be normally matched.

The configuration table includes, for example, an item for storing the address information and an item for storing the apparatus information.

When a record is received from the controller 3, the PC 2 registers the received record in the configuration table. For example, when the record 1020 illustrated in FIG. 11 is received from the controller 3, the PC 2 registers the record 1020 as a record with shading in the configuration table in FIG. 12. The PC 2 and the controller 3 can ascertain which electric apparatus 6 is connected to which location on a network by generating the configuration table although the input unit 4B does not correspond to the superimposed signal communication. Further, when a signal is received from the communication port of the input unit 4B, the PC 2 and the controller 3 can specify the electric apparatus 6 of which the signal is the received signal based on the association information.

§ 3 Operation Example of Configuration Example (1)

[When Apparatus is Installed]

Figure 13:
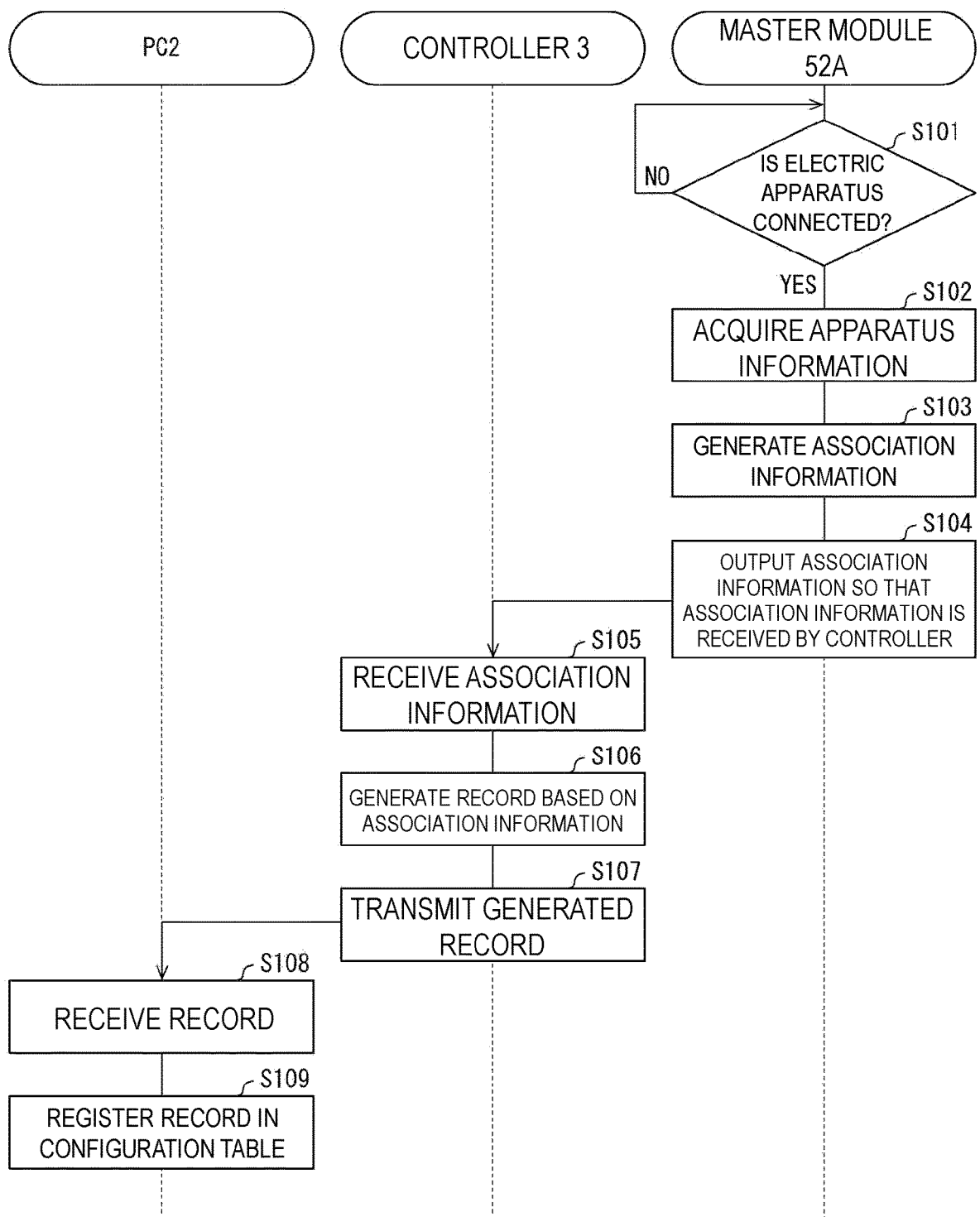
FIG. 13 is a flowchart illustrating a flow of a process of each device belonging to the communication system according to an aspect of the present disclosure.

FIG. 13 is a flowchart illustrating a flow of a process of each device belonging to the communication system 1. The flowchart illustrated in FIG. 13 shows, for example, a flow of a series of processes when a new electric apparatus 6 is installed in the communication system 1 according to the configuration example (1). A processing procedure to be described below is merely exemplary and each process may be changed as much as possible. Steps may be omitted, substituted, and added appropriately to the processing procedure to be described below according to an embodiment.

In S101, when the master module 52A is connected to the electric apparatus 6 via the communication cable 51 (Yes in S101), the data signal processing unit 44 of the master module 52A can receive the superimposed signal transmitted from the electric apparatus 6 via one communication port of the downstream communication port group 54 and process the superimposed signal.

In S102, the apparatus information acquisition unit 501 acquires the apparatus information from the data signal extracted from the superimposed signal by the data signal processing unit 44.

In S103, the information association unit 502 generates the association information. Specifically, the information association unit 502 generates the association information by associating the bit value allocated to the above-described communication port through which the superimposed signal is received and the apparatus information acquired in S102 with the unit ID with which the master module 52A or the input unit 4B corresponding to the master module 52A can be uniquely specified.

In S104, the information output unit 503 outputs the association information so that the generated association information is received by the controller 3. As an example, the information output unit 503 transmits the association information to the controller 3 via the communication unit 513 in Ethernet communication. As another example, the information output unit 503 may write the association information on an externally attached information storage medium such as a universal serial bus (USB) memory or an SD card which can be mounted in the master module 52A. The information storage medium on which the association information is written can be connected to the controller 3 or the PC 2 so that the controller 3 or the PC 2 can read the association information. In this way, the association information may be supplied from the information output unit 503 to the controller 3 or the PC 2. As still another example, the information output unit 503 may output the association information to a display device, a printing apparatus, or the like (not illustrated) and presents a correspondent relation between the communication port and the electric apparatus 6 to the user. In this case, the association information is input to the controller 3 or the PC 2 by the user.

In S105, the control unit 610 of the controller 3 receives the association information via the communication unit 613. For example, the association information 1010 illustrated in FIG. 11 is received.

In S106, the control unit 610 generates the record which will be registered in the configuration table based on the association information. For example, the record 1020 illustrated in FIG. 11 is generated based on the association information 1010.

In S107, the control unit 610 transmits the generated record to the PC 2 via the communication unit 613. The control unit 610 may make direct access to the configuration table shared with the PC 2 and register the generated record in the configuration table.

In S108, the PC 2 receives the record.

In S109, the PC 2 registers the received record in, for example, the configuration table illustrated in FIG. 12.

According to the above-described method, although the input unit 4B which does not correspond to the superimposed signal communication is used, the electric apparatus 6 which is an apparatus corresponding to the superimposed signal communication can be identified by the master module 52A corresponding to the superimposed signal communication in various devices upstream from the input unit 4B. For example, based on the communication port through which the operation signal is received, the electric apparatus 6 of which the operation signal is the received operation signal can be specified from the association information. Therefore, the electric apparatus 6 can be appropriately managed and monitored.

[When Abnormality Has Occurred]

Figure 14:
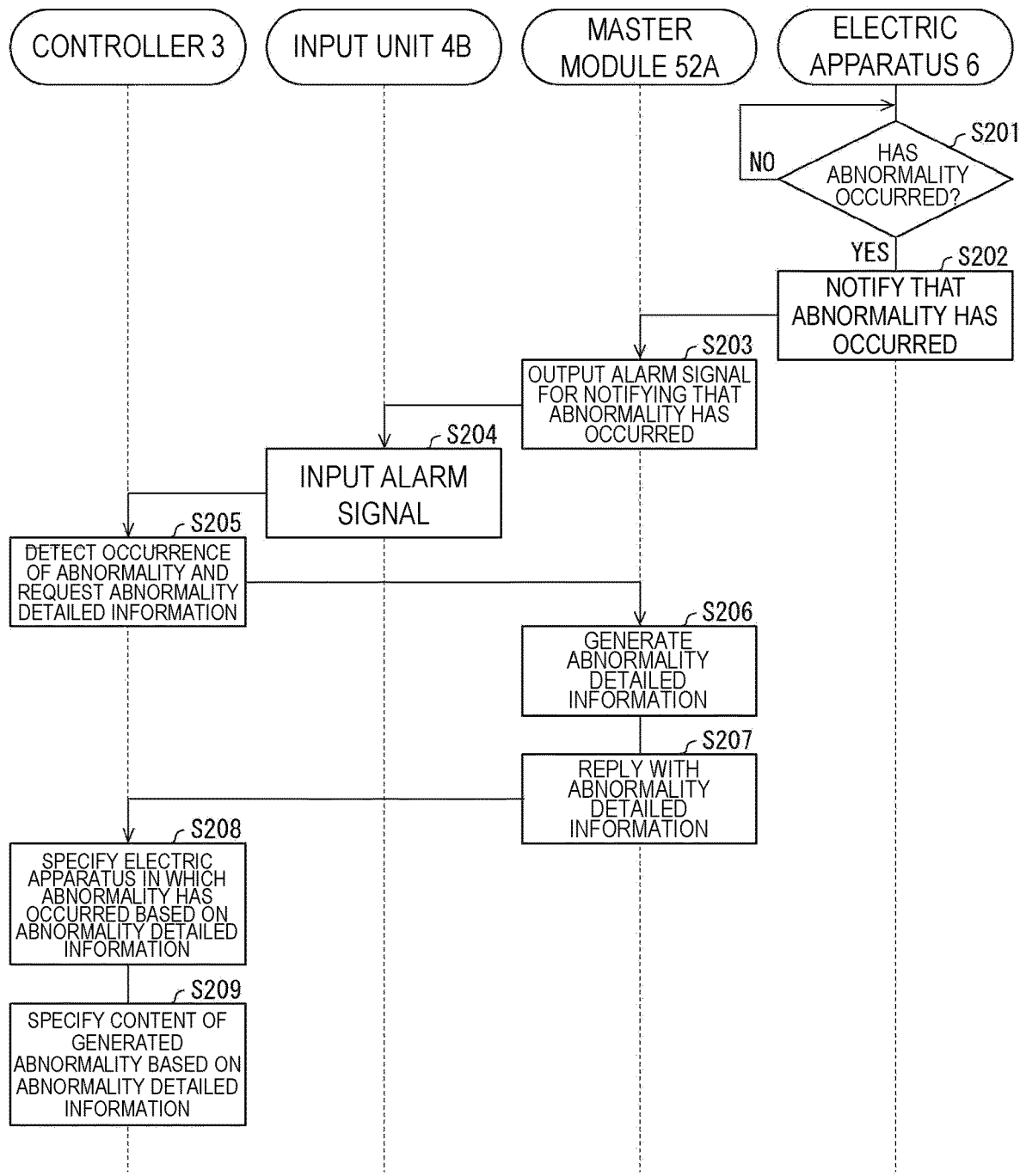
FIG. 14 is a flowchart illustrating a flow of a process of each device belonging to the communication system according to an aspect of the present disclosure.

FIG. 14 is a flowchart illustrating a flow of a process of each device belonging to the communication system 1. The flowchart illustrated in FIG. 14 shows, for example, a flow of a series of processes when an abnormality has occurred in any electric apparatus 6 in the communication system 1 according to the configuration example (1). A processing procedure to be described below is merely exemplary and each process may be changed as much as possible. Steps may be omitted, substituted, and added appropriately to the processing procedure to be described below according to an embodiment.

In S201, when an abnormality such as a failure has occurred in one electric apparatus 6 (Yes in S201), the process proceeds to S202 processed by the electric apparatus 6.

In S202, the electric apparatus 6 notifies the master module 52A that the abnormality has occurred. Specifically, the signal processing device 100 provided in the electric apparatus 6 carries status information indicating an abnormal state of the electric apparatus 6 as predetermined information regarding the electric apparatus 6 in the superimposed signal to transmit the status information to the master module 52A.

In S203, the abnormality information generation unit 504 operates the unit control circuit 36 and the transistor 39 based on the status information indicated by the data signal processed by the data signal processing unit 44 to generate an alarm signal. The information output unit 503 transmits the generated alarm signal to the input unit 4B via the signal line 58 and the communication port for transmitting the alarm signal in the upstream communication port group 55.

In S204, the input unit 4B inputs the alarm signal received via the signal line 58 to the controller 3.

In S205 (an abnormality detection step), the abnormality detection unit 601 of the controller 3 detects occurrence of the abnormality in any electric apparatus 6 based on the input alarm signal. Then, the abnormality detection unit 601 requests the master module 52A to transmit the abnormality detailed information via the communication unit 613.

In S206, the abnormality information generation unit 504 generates the abnormality detailed information in response to a request from the controller 3. The abnormality detailed information generated here includes, for example, the first information for specifying the electric apparatus 6 in which the abnormality has occurred and the second information indicating the content of the abnormality which has occurred in the electric apparatus 6, such as the bit value or the apparatus information. For example, the status information supplied from the electric apparatus 6 includes information indicating content of an abnormality. The abnormality information generation unit 504 can generate the second information based on the status information.

In S207, the information output unit 503 outputs the abnormality detailed information generated in S206 so that the abnormality detailed information can be received by the controller 3. For example, the information output unit 503 replies to the controller 3 via the communication unit 513 with the abnormality detailed information as a response to the above-described request.

In S208 (an apparatus specifying step), the abnormal apparatus specifying unit 602 specifies the electric apparatus 6 in which the abnormality has occurred based on the first information included in the abnormality detailed information received via the communication unit 613.

In S209 (an abnormality specifying step), the abnormality content specifying unit 603 specifies the content of the abnormality that has occurred in the electric apparatus 6 based on the second information included in the above-described received abnormality detailed information.

According to the above-described method, although the input unit 4B which does not correspond to the superimposed signal communication is used, information regarding the abnormality that has occurred in the electric apparatus 6 which is a device corresponding to the superimposed signal communication can be obtained by the master module 52A corresponding to the superimposed signal communication in various devices upstream from the input unit 4B. For example, the content of the abnormality can be ascertained by detecting the abnormality that has occurred in the electric apparatus 6 based on the alarm signal which is the abnormality occurrence notification, and acquiring the abnormality detailed information of the electric apparatus 6 from the master module 52A, and specifying the electric apparatus 6 in which the abnormality has occurred. Thus, the controller 3 or the PC 2 can take appropriate countermeasures against the occurrence of the abnormality. For example, the PC 2 can present accurate information related to the occurrence of the abnormality to the user or present an appropriate countermeasure method.

§ 4 Configuration Example (2)

In a configuration example (2), the master module 52A is connected to the input unit 4B in parallel. The superimposed signal of the electric apparatus 6 is input to the input unit 4B which does not correspond to the superimposed signal communication without processing the superimposed signal. In the configuration example, when the superimposed signal is input, the input unit 4B which does not correspond to the superimposed signal communication cannot extract the data signal from the superimposed signal, but can handle the superimposed signal as an operation signal of the electric apparatus 6. In the configuration example, a circuit configuration and a wire related to separation of the operation signal in the master module 52A can be simplified compared to the configuration example (1). Therefore, the configuration example can be appropriately adopted to a case in which the input unit 4B can correctly input ON or OFF as the operation signal to the controller 3 although the superimposed signal is input without being processed.

[Hardware Configuration]

A difference between the configuration examples (2) and (1) in the block diagram illustrated in FIG. 9 is that the superimposed signal output from the signal processing device 100 is transmitted from the master module 52A to the input unit 4B, as it is, without separating the operation signal.

As one example, a first mode is conceivable in which the communication cable 51 to which the electric apparatus 6 is connected is divided into two sections outside of the master module 52A, one of the sections is connected to the input unit 4B, and the other section is connected to the master module 52A. In this case, while the superimposed signal output from the signal processing device 100 of the electric apparatus 6 is transmitted to the master module 52A to process the data signal, the superimposed signal is also transmitted to the input unit 4B without being processed to process the operation signal.

As another example, a second mode is conceivable in which the communication cable 51 is not divided and division into a first section for processing the data signal and a second section for causing the data signal to flow to the input unit 4B without being processed is realized in the master module 52A. In this case, the superimposed signal output from the signal processing device 100 via the communication cable 51 is input temporarily to the master module 52A and is transmitted to the input unit 4B via the signal line group 57 as the unprocessed superimposed signal without separating the operation signal by the operation signal processing unit 43 of the master module 52A.

The first mode has the advantage that the number of connection components provided in the master module 52A is small. The second mode has the advantage that each communication cable 51 to which each electric apparatus 6 is connected is not divided.

Figure 15:
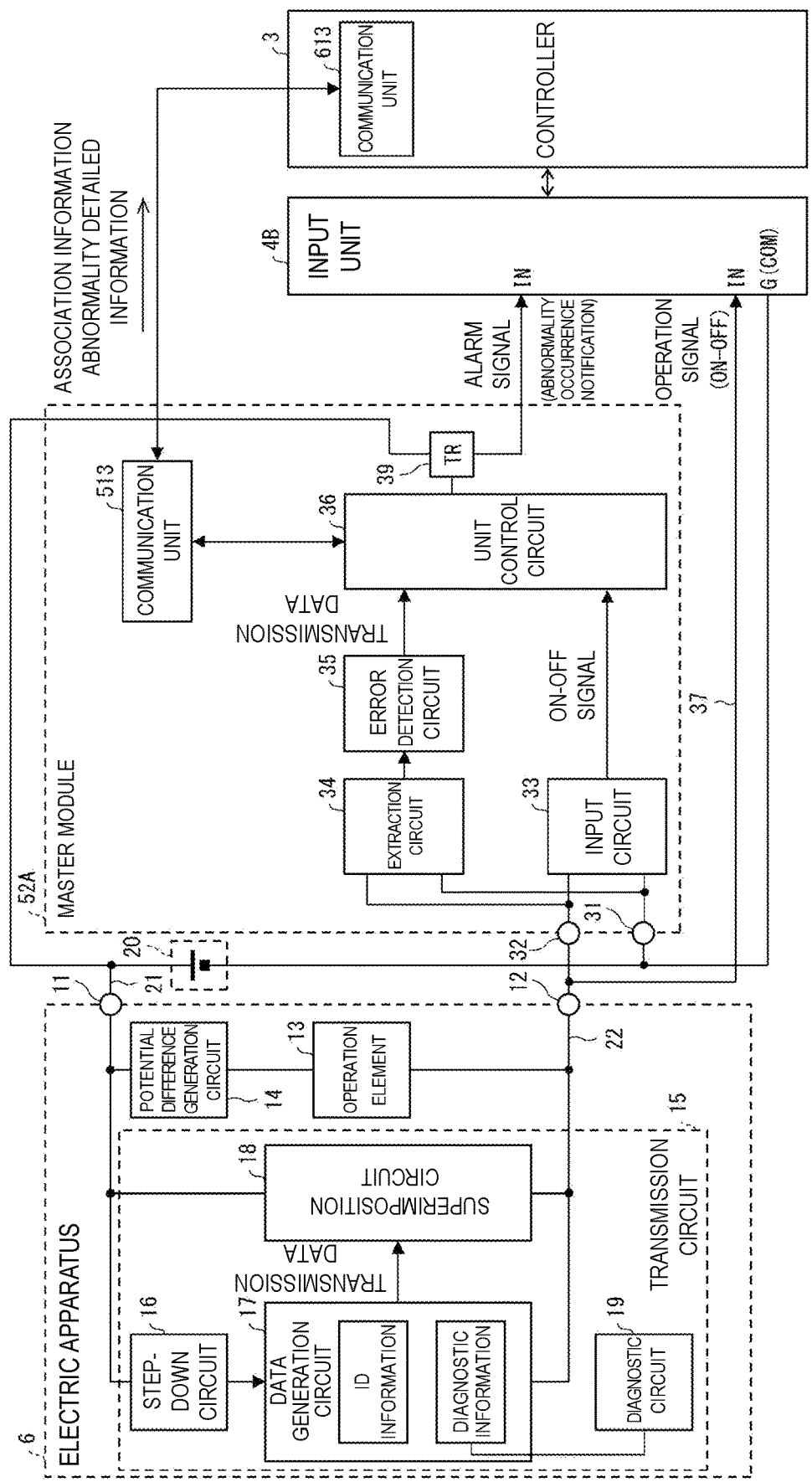
FIG. 15 is a block diagram illustrating a circuit configuration of the master module according to a configuration example (2) which is an aspect of the present disclosure.

FIG. 15 is a block diagram illustrating a circuit configuration of the master module 52A according to the configuration example (2) which is an aspect of the present disclosure. A difference between the block diagram related to the configuration example (2) illustrated in FIG. 15 and the block diagram of the configuration example (1) illustrated in FIG. 10 is that a signal line 37 divided to directly transmit the superimposed signal to the input unit 4B is provided in the communication cable 51. The superimposed signal output from the second terminal 12 is input directly to the input unit 4B via the signal line 37 and is processed as an operation signal in the input unit 4B.

In the case of the above-described second mode, a dedicated connection terminal (not illustrated) directly outputting the superimposed signal to the input unit 4B is provided in the master module 52A. The superimposed signal input to the master module 52A is transmitted directly to the input unit 4B via the above-described dedicated connection terminal without passing through various circuits of the master module 52A in the second section.

In this way, it is not necessary for the master module 52A to include the transistor 38 outputting the operation signal in any mode.

[Functional Configuration]

A functional configuration of each device of the master module 52A and the controller 3 according to the configuration example (2) has been described in the configuration example (1) with reference to FIG. 9. In the configuration example, in the master module 52A, the process of separating the operation signal from the superimposed signal received from the electric apparatus 6 is omitted and the operation signal processing unit 43 transmits the unprocessed superimposed signal to the input unit 4B via the signal line corresponding to the electric apparatus 6 in the signal line group 57.

§ 5 Operation Example of Configuration Example (2)

[When Apparatus Is Installed]
A flow of a series of processes of each device when the electric apparatus 6 is newly installed in the communication system 1 according to the configuration example (2) is illustrated in, for example, FIG. 13.
[When Abnormality Has Occurred]
A flow of a series of processes of each device when an abnormality has occurred in any electric apparatus 6 in the communication system 1 according to the configuration example (2) is illustrated in, for example, FIG. 14.

§ 6 Configuration Example (3)

In a configuration example (3), the master module 52A separates the superimposed signal into the data signal and the operation signal as in the configuration example (1). In the configuration example, on the other hand, the master module 52A delivers the operation signal and other necessary information to the input unit 4B by outputting an ON-OFF signal without using communication means such as Ethernet. Specifically, the master module 52A outputs the alarm signal processed as the abnormality occurrence notification to the input unit 4B via the signal line 58 and also outputs a report signal processed as abnormality detailed information to the input unit 4B via the signal line 58. The controller 3 is configured to be appropriate for such an operation of the master module 52A. Specifically, the controller 3 is configured so that when an ON-OFF signal corresponding to the alarm signal is input to the input unit 4B via the signal line 58, the ON-OFF signal is processed as an abnormality occurrence notification, and when an ON-OFF signal corresponding to the report signal is input to the input unit 4B, the ON-OFF signal is processed as serial data including the abnormality detailed information.

Thus, communication means for transmitting the abnormality detailed information to the controller 3, specifically, the communication unit 513 of the master module 52A and the communication unit 613 of the controller 3, can be omitted. In the configuration example, the communication unit provided in conformity with a specific communication standard can be omitted, and the circuit configuration and the wiring of the master module 52A can be simplified, compared to the configuration example (1). Accordingly, the configuration example can be appropriately adopted to a case in which the controller 3 (for example, the PLC) has a function of processing and dividing the alarm signal and the report signal, as described above.

As another example, the master module 52A may not generate and output the alarm signal. In this case, only the report signal is output from the signal line 58 connected to the master module 52A. The controller 3 may be configured to process the received report signal as the abnormality occurrence notification and the abnormality detailed information.

In the configuration example, it is assumed that the association information is supplied in advance from the information output unit 503 to the controller 3 or the PC 2, for example, via an externally attached information storage medium or through a manual input of the user, as described in S104 which is an operation example of the configuration example (1).
[Hardware Configuration]
A difference between the configuration examples (3) and (1) in the block diagram illustrated in FIG. 9 is that the communication unit 513 can be omitted in the master module 52A and the communication unit 613 can be omitted in the controller 3.

Figure 16:
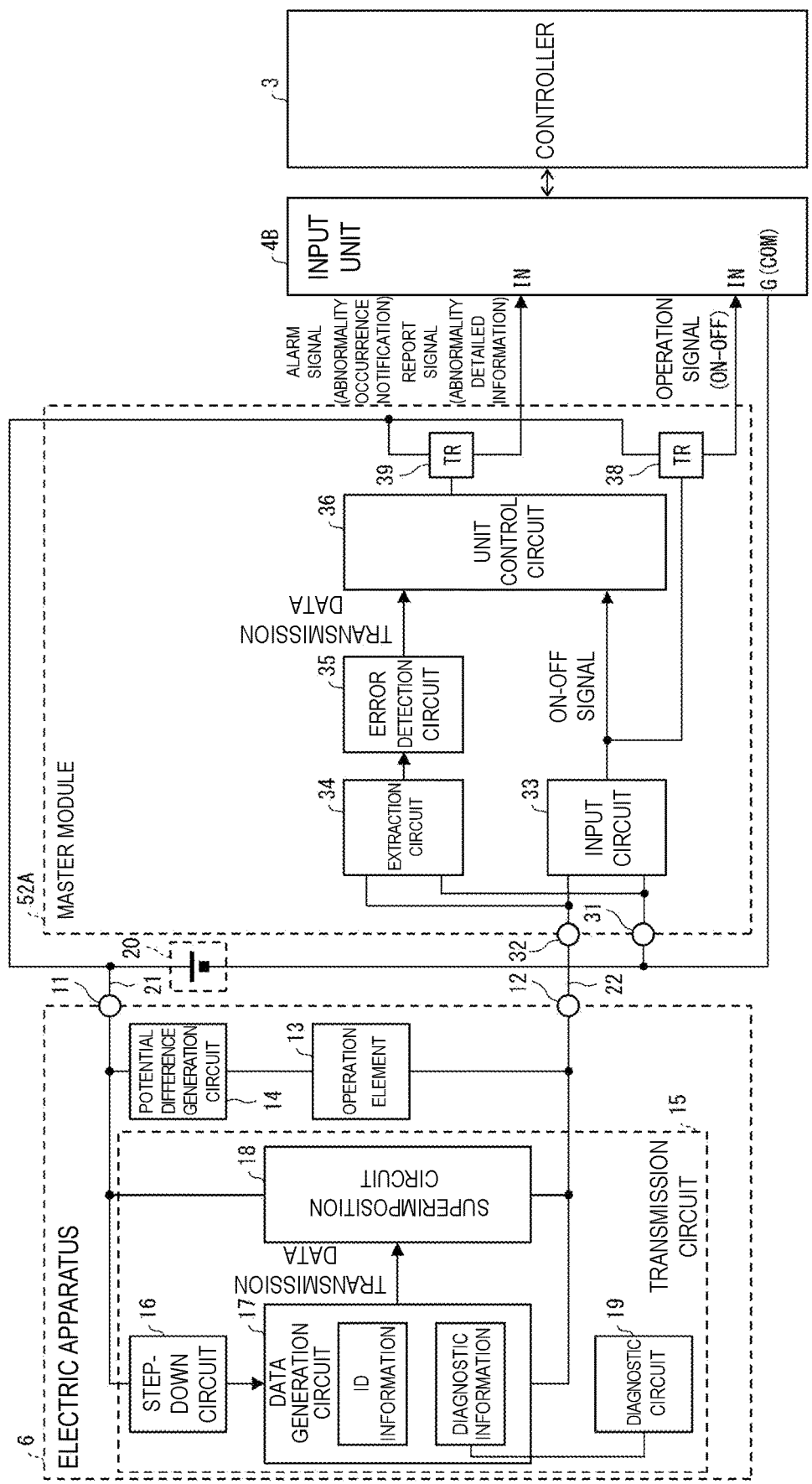
FIG. 16 is a block diagram illustrating a circuit configuration of the master module according to a configuration example (3) which is an aspect of the present disclosure.

FIG. 16 is a block diagram illustrating a circuit configuration of the master module 52A according to the configuration example (3) which is an aspect of the present disclosure. A difference between the block diagram of the configuration example (3) illustrated in FIG. 16 and the block diagram of the configuration example (1) illustrated in FIG. 10 is that the master module 52A may not include the communication unit 513.

In the configuration example, the master module 52A includes the transistors 38 and 39 as in the configuration example (1). Here, in the configuration example, the transistor 39 operates to output the report signal in addition to the alarm signal.

[Functional Configuration]
<Master Module 52A>

In the master module 52A of the configuration example (3), when the superimposed signal in which the status information indicating the abnormal state of the electric apparatus 6 is carried is received from the electric apparatus 6, the abnormality information generation unit 504 first operates the unit control circuit 36 and the transistor 39 to generate the alarm signal (a first ON-OFF signal) as the abnormality occurrence notification. The alarm signal may have a specific waveform or a fixed length which can be determined as the alarm signal in the controller 3, or may include an instruction signal for designating the controller 3 handling the ON-OFF signal as the alarm signal at a predetermined position of the alarm signal.

Subsequently, the abnormality information generation unit 504 operates the unit control circuit 36 and the transistor 39 to generate a report signal (a second ON-OFF signal) as the abnormality detailed information. As described above, the abnormality detailed information includes the first information for specifying that the electric apparatus 6 in which an abnormality has occurred and the second information indicating content of the occurring abnormality. Accordingly, the report signal is serial data indicating the first information and the second information by ON and OFF. The report signal may have a specific waveform or a fixed length which can be determined as the report signal in the controller 3, or may include an instruction signal for designating the controller 3 handling the ON-OFF signal as the report signal at a predetermined position of the report signal.

The information output unit 503 operates the transistor 39 to output the alarm signal and the report signal to the input unit 4B via the upstream communication port group 55 and the signal line 58. The alarm signal and the report signal are input to the controller 3 via the input unit 4B.
<Controller 3>

The controller 3 related to the configuration example (3) is different from the controller 3 in the configuration example (1) in that the control unit 610 further includes a signal conversion unit 604.

The signal conversion unit 604 processes the alarm signal and the report signal supplied from the master module 52A. Specifically, when the input ON-OFF signal is the alarm signal, the signal conversion unit 604 causes the abnormality detection unit 601 to process the alarm signal. When the input ON-OFF signal is the report signal, the signal conversion unit 604 converts the report signal into the serial data which can be interpreted as the abnormality detailed information. The signal conversion unit 604 causes the abnormal apparatus specifying unit 602 and the abnormality content specifying unit 603 to process the abnormality detailed information obtained through the conversion.

Based on a waveform or a fixed length of the ON-OFF signal or an instruction signal included at a predetermined position of the ON-OFF signal, the signal conversion unit 604 may determine whether the ON-OFF signal is the alarm signal or the report signal. Alternatively, when only the report signal is input from the signal line 58, the signal conversion unit 604 may cause the abnormality detection unit 601 to detect an abnormality by transmitting the report signal to the abnormality detection unit 601.

§ 7 Operation Example of Configuration Example (3)

[When Apparatus is Installed]

A flow of a series of processes of each device when the electric apparatus 6 is newly installed in the communication system 1 related to the configuration example (3) is illustrated in, for example, FIG. 13. Here, in the configuration example, when the master module 52A and the controller 3 do not include the communication units 513 and 613 respectively, the association information is supplied to the controller 3 or the PC 2, for example, via an externally attached information storage medium or through a manual input of the user, as described in S104.

[When Abnormality has Occurred]

Figure 17:
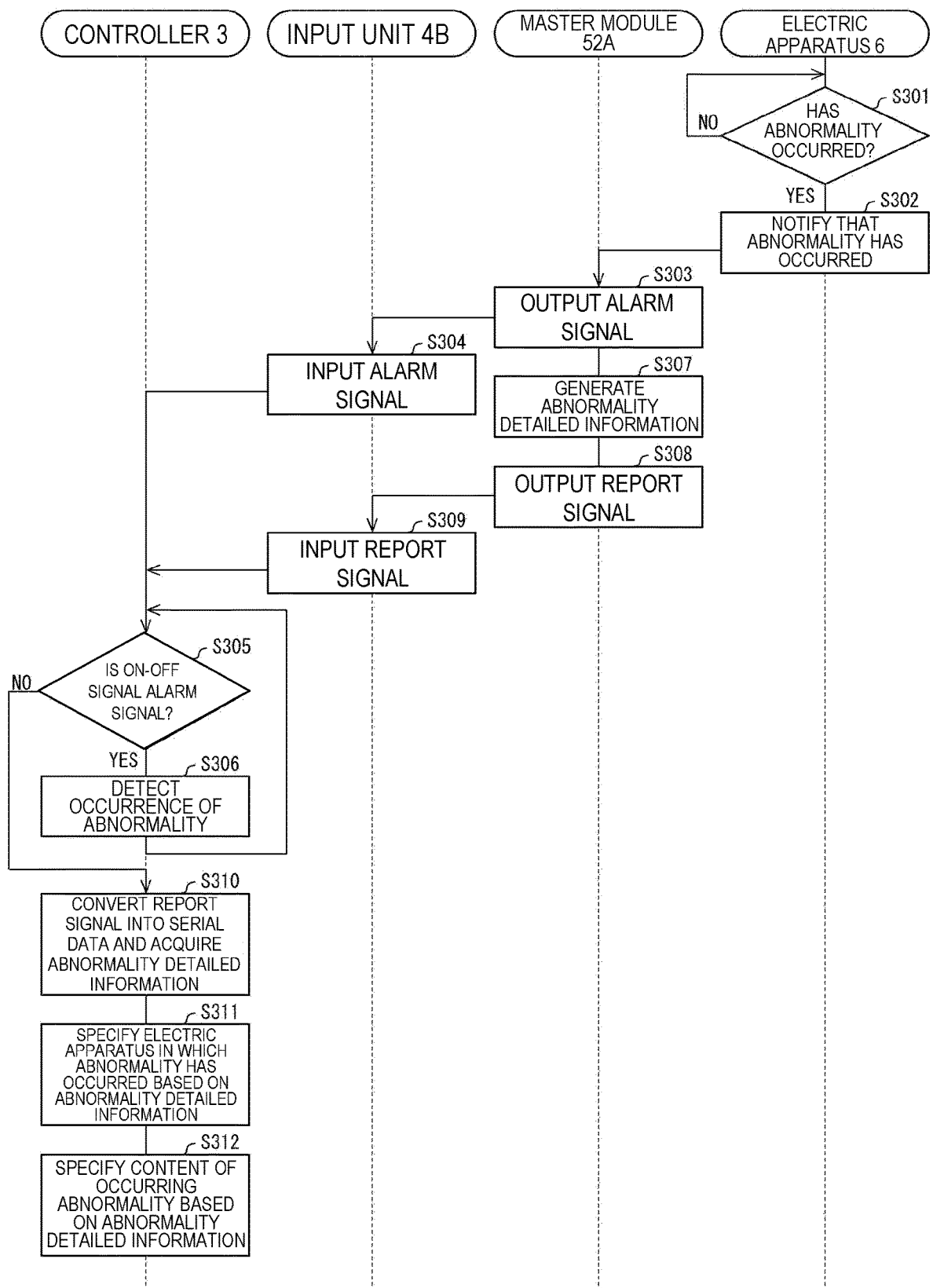
FIG. 17 is a flowchart illustrating a flow of a process of each device belonging to the communication system according to an aspect of the present disclosure.

FIG. 17 is a flowchart illustrating a flow of a process of each device belonging to the communication system 1. The flowchart illustrated in FIG. 17 shows, for example, a flow of a series of processes when an abnormality has occurred in any electric apparatus 6 in the communication system 1 according to the configuration example (3). A processing procedure to be described below is merely exemplary and each process may be changed as much as possible. Steps may be omitted, substituted, and added appropriately to the processing procedure to be described below according to an embodiment.

When an abnormality such as a failure has occurred in one electric apparatus 6 in S301 (Yes in S301), the process proceeds to S302 processed by the electric apparatus 6.

In S302, the electric apparatus 6 notifies the master module 52A that the abnormality has occurred. Specifically, the signal processing device 100 provided in the electric apparatus 6 carries, for example, the status information indicating an abnormal state of the electric apparatus 6 as predetermined information regarding the electric apparatus 6 in the superimposed signal to transmit the status information to the master module 52A.

In S303, the abnormality information generation unit 504 operates the unit control circuit 36 and the transistor 39 based on the status information indicated by the data signal processed by the data signal processing unit 44 to generate an alarm signal. The information output unit 503 transmits the alarm signal to the input unit 4B via the signal line 58.

In S304, the input unit 4B inputs the alarm signal received via the signal line 58 to the controller 3.

In S305, the signal conversion unit 604 determines that the input ON-OFF signal is the alarm signal based on the waveform or the fixed length of the ON-OFF signal or the instruction signal (Yes in S305) and causes the abnormality detection unit 601 to process the alarm signal.

In S306 (an abnormality detection step), the abnormality detection unit 601 detects occurrence of the abnormality in any electric apparatus 6 based on the input alarm signal.

In S307, the abnormality information generation unit 504 of the master module 52A generates the abnormality detailed information after the process of S303. The abnormality detailed information includes, for example, the first information and the second information indicating the content of the abnormality which has occurred in the electric apparatus 6, such as the bit value or the apparatus information. The content of the abnormality may indicate, for example, the status information output from the electric apparatus 6 in S302.

In S308, the abnormality information generation unit 504 operates the unit control circuit 36 and the transistor 39 and outputs the report signal including the abnormality detailed information generated in S307 to the input unit 4B via the signal line 58.

In S309, the input unit 4B inputs the report signal received via the signal line 58 to the controller 3.

The process returns from S306 to S305, the signal conversion unit 604 determines that the input ON-OFF signal is the report signal based on the waveform or the fixed length of the ON-OFF signal or the instruction signal (No in S305) and the process proceeds to S310.

In S310, the signal conversion unit 604 converts the report signal into the serial data and acquires the abnormality detailed information.

In S311 (an apparatus specifying step), the abnormal apparatus specifying unit 602 specifies the electric apparatus 6 in which the abnormality has occurred based on the first information included in the abnormality detailed information acquired in S310.

In S312 (an abnormality specifying step), the abnormality content specifying unit 603 specifies the content of the abnormality that has occurred in the electric apparatus 6 based on the second information included in the above-described abnormality detailed information.

According to the above-described method, although the input unit 4B which does not correspond to the superimposed signal communication is used, abnormality information in the electric apparatus 6 which is a device corresponding to the superimposed signal communication can be obtained by the master module 52A corresponding to the superimposed signal communication in various devices upstream from the input unit 4B. That is, the controller 3 can quickly detect the abnormality which has occurred in the electric apparatus 6. Further, when the abnormality detailed information is provided, the controller 3 can specify the electric apparatus 6 in which the abnormality has occurred and specify the content of the occurring abnormality.

§ 8 Configuration Example (4)

In a configuration example (4), the master module 52A uses communication means in conformity with a predetermined communication standard such as Ethernet to realize the supply of the association information, the supply of the abnormality occurrence notification, and the supply of the abnormality detailed information through communication with the controller 3. Accordingly, in the configuration example, the signal line 58 used to transmit the alarm signal or the report signal from the master module 52A to the input unit 4B can be omitted. The signal line 58 can be used to monitor the other electric apparatuses 6 like the signal line group 57.

[Hardware Configuration]

A block diagram of the configuration example (4) is illustrated in FIG. 9 as in the configuration example (1).

Figure 18:
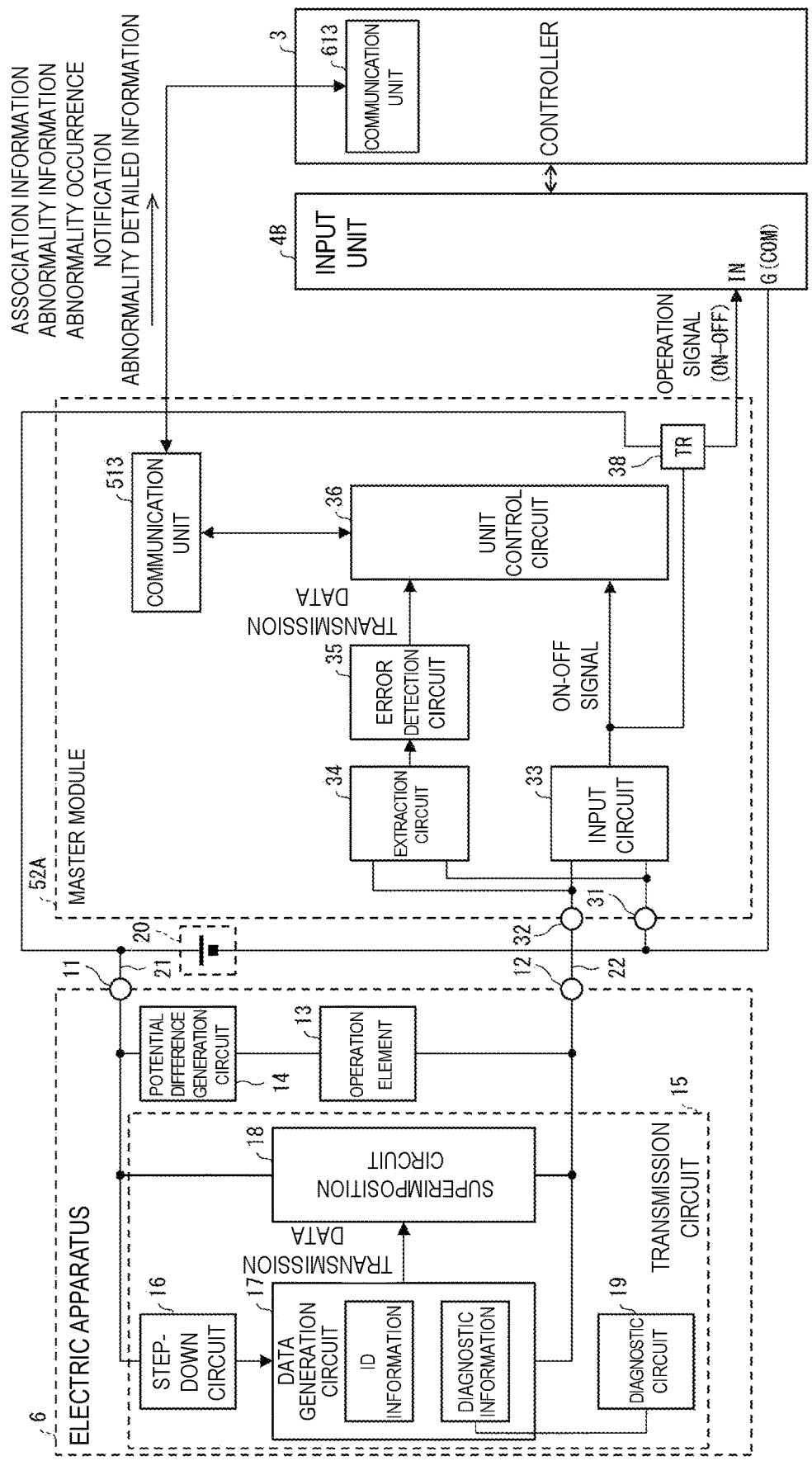
FIG. 18 is a block diagram illustrating a circuit configuration of the master module according to a configuration example (4) which is an aspect of the present disclosure.

FIG. 18 is a block diagram illustrating a circuit configuration of the master module 52A according to the configuration example (4) which is an aspect of the present disclosure. A difference between the block diagram of the configuration example (4) illustrated in FIG. 18 and the block diagram of the configuration example (1) illustrated in FIG. 10 is that the master module 52A does not include the transistor 39 and abnormality information is transmitted from the communication unit 513 to the communication unit 613 via communication means such as Ethernet. Accordingly, in the configuration example, the dedicated signal line 58 for transmitting and receiving the alarm signal or the report signal is not provided.

[Functional Configuration]

A functional configuration of each device of the master module 52A and the controller 3 related to the configuration example (4) has been described in the configuration example (1) with reference to FIG. 9.

<Master Module 52A>

In the configuration example, in the master module 52A, the abnormality information generation unit 504 may generate the abnormality occurrence notification instead of generating the alarm signal when an abnormality has occurred in the electric apparatus 6. In this case, the information output unit 503 first transmits the generated abnormality occurrence notification to the controller 3 via the communication unit 513, and subsequently transmits the abnormality detailed information generated by the abnormality information generation unit 504 to the controller 3. The information output unit 503 may transmit the abnormality occurrence notification earlier than the abnormality detailed information to the controller 3, and subsequently reply the abnormality detailed information response to a request from the controller 3. Alternatively, the information output unit 503 may transmit the abnormality occurrence notification along with the abnormality detailed information to the controller 3. Alternatively, the abnormality information generation unit 504 may not generate the abnormality occurrence notification separately from the abnormality detailed information. In this case, the information output unit 503 transmits the abnormality detailed information generated by the abnormality information generation unit 504 to the controller 3 via the communication unit 513 as well as the purpose for notifying that the abnormality has occurred.

<Controller 3>

In the controller 3, the abnormality detection unit 601 may detect occurrence of the abnormality by receiving the abnormality occurrence notification via the communication unit 613 and request the master module 52A to transmit the abnormality detailed information via the communication unit 613 in response to the detection.

Alternatively, the abnormality detection unit 601 may detect occurrence of the abnormality based on the abnormality detailed information received via the communication unit 613. The abnormal apparatus specifying unit 602 and the abnormality content specifying unit 603 specify the electric apparatus 6 in which the abnormality has occurred and the content of the occurring abnormality based on the received abnormality detailed information.

§ 9 Operation Example of Configuration Example (4)

[When Apparatus Is Installed]

A flow of a series of processes of each device when the electric apparatus 6 is newly installed in the communication system 1 according to the configuration example (4) is illustrated in FIG. 13.

[When Abnormality has Occurred]

Figure 19:
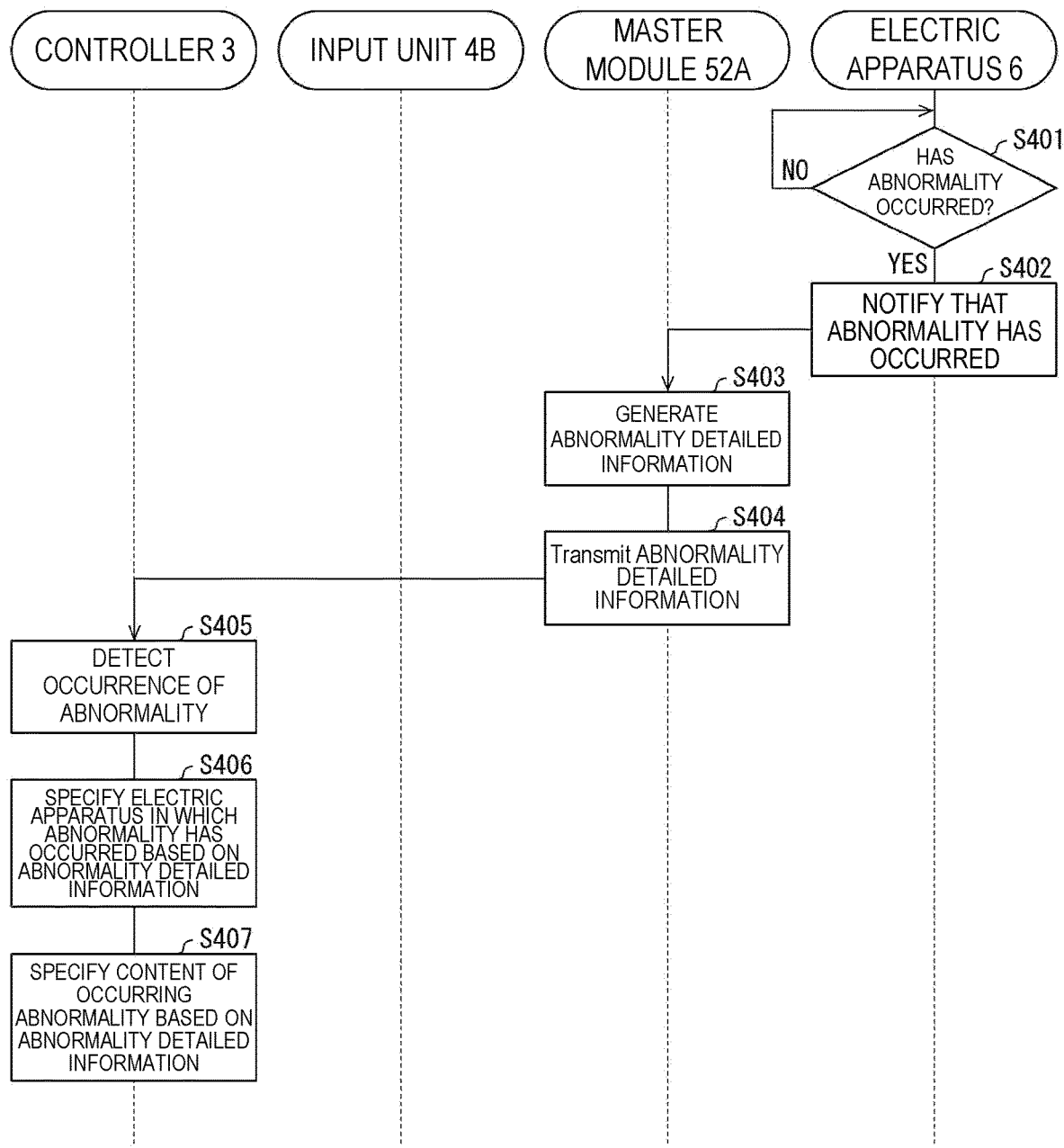
FIG. 19 is a flowchart illustrating a flow of a process of each device belonging to the communication system according to an aspect of the present disclosure.

FIG. 19 is a flowchart illustrating a flow of a process of each device belonging to the communication system 1. The flowchart illustrated in FIG. 19 shows, for example, a flow of a series of processes when an abnormality has occurred in any electric apparatus 6 in the communication system 1 according to the configuration example (4). A processing procedure to be described below is merely exemplary and each process may be changed as much as possible. Steps may be omitted, substituted, and added appropriately to the processing procedure to be described below according to an embodiment.

When an abnormality such as a failure has occurred in one electric apparatus 6 in S401 (Yes in S401), the process proceeds to S402 processed by the electric apparatus 6.

In S402, the electric apparatus 6 notifies the master module 52A that the abnormality has occurred. Specifically, as in the configuration example (1), the signal processing device 100 carries the status information indicating an abnormal state of the electric apparatus 6 in the superimposed signal to transmit the status information to the master module 52A.

In S403, the abnormality information generation unit 504 of the master module 52A generates the abnormality detailed information including the first information and the second information based on the status information.

In S404, the information output unit 503 transmits the generated abnormality detailed information to the controller 3 via the communication unit 513. In the example illustrated in FIG. 19, the transmission of the abnormality detailed information also serves as notification of the occurrence of the abnormality.

In S405 (an abnormality detection step), the abnormality detection unit 601 detects occurrence of the abnormality in any electric apparatus 6 based on the abnormality detailed information received via the communication unit 613.

In S406 (an apparatus specifying step), the abnormal apparatus specifying unit 602 specifies the electric apparatus 6 in which the abnormality has occurred based on the first information included in the received abnormality detailed information.

In S407 (an abnormality specifying step), the abnormality content specifying unit 603 specifies the content of the abnormality that has occurred in the electric apparatus 6 based on the second information included in the above-described abnormality detailed information.

According to the above-described method, although the input unit 4B which does not correspond to the superimposed signal communication is used, abnormality information in the electric apparatus 6 which is a device corresponding to the superimposed signal communication can be obtained by the master module 52A corresponding to the superimposed signal communication in various devices upstream from the input unit 4B. That is, the controller 3 can quickly detect the abnormality which has occurred in the electric apparatus 6. Further, when the abnormality detailed information is provided, the controller 3 can specify the electric apparatus 6 in which the abnormality has occurred and specify the content of the occurring abnormality.

§ 10 Modified Example 5

In the configuration examples (1) to (4), as described above, in order for the controller 3 to correctly identify and monitor all the electric apparatuses 6 in the communication system 1, the communication ports with the same bit values are connected to each other without erroneousness in a one-to-one manner via the signal line group 57 with regard to the communication ports of the upstream communication port group 55 of the master module 52A and the communication ports of the communication port group 56 of the input unit 4B. When there is erroneousness in the wiring, an operation of the electric apparatus 6 cannot be correctly monitored. Accordingly, as preventive measures for erroneous wiring, the master module 52A preferably has a configuration for correctly checking wiring, as will be described below.

Preventive Measures for Erroneous Wiring: First Example

Figure 20:
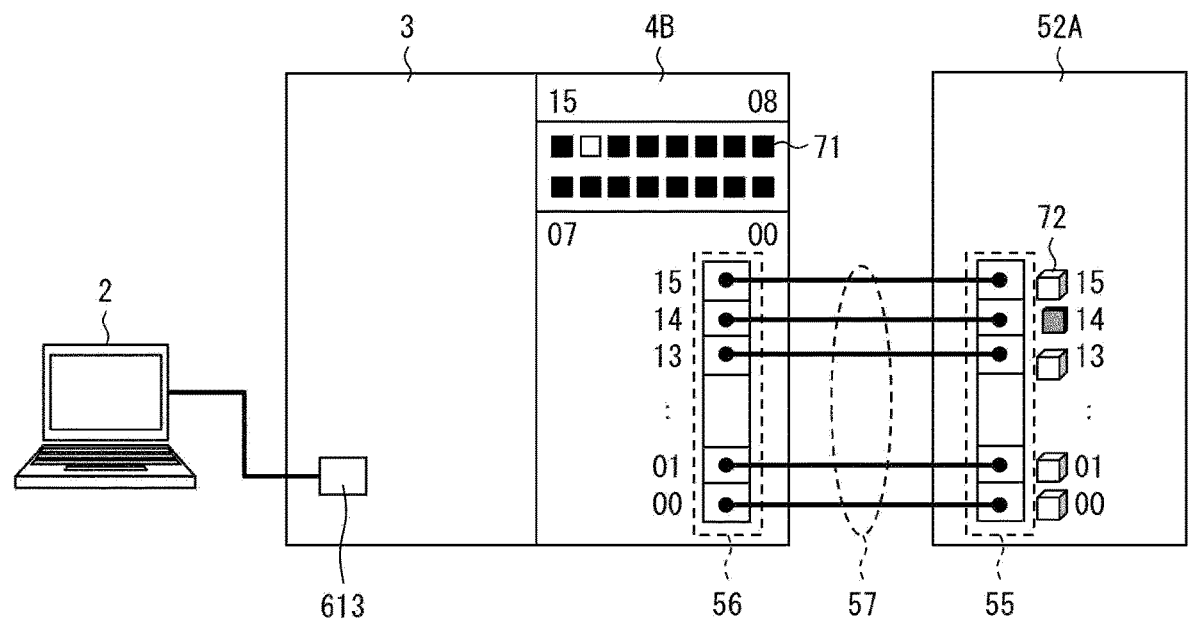
FIG. 20 is a diagram illustrating an example of a connection configuration between an input unit and the master module according to an aspect of the present disclosure.

FIG. 20 is a diagram illustrating an example of a connection configuration between the input unit 4B and the master module 52A.

As illustrated in FIG. 20, for example, the communication ports with the same bit values have to be connected to each other via the signal line group 57 in a one-to-one manner with regard to the communication port group 56 of the input unit 4B and the upstream communication port group 55 of the master module 52A. In a first example, the master module 52A includes a pressing button switch 72 (first input unit) for each communication port of the upstream communication port group 55 to check correctness of the wiring. The input unit 4B is assumed to include an LED 71 (display unit) corresponding to each communication port of the communication port group 56.

The LED 71 is configured to be turned on while an ON signal is input via the corresponding communication port. For example, while an ON signal (test signal) is input to the communication port with a bit value of "15" in the communication port group 56, the LED 71 corresponding to the communication port with the bit value of "15" is turned on.

The pressing button switch 72 is a test switch provided to perform a test to check correctness of the wiring. When the pressing button switch 72 is turned on, the operation signal processing unit 43 operates the transistor 38 and outputs an ON signal from the communication port connected to the pressing button switch 72 which is turned on. For example, when the pressing button switch 72 corresponding to a bit value of "14" is pressed, the operation signal processing unit 43 outputs the ON signal from the communication port to which the bit value of "14" is allocated.

When the wiring of the signal line group 57 is correct, the ON signal output from the communication port with the bit value of "14" in the upstream communication port group 55 is correctly input to the communication port with the bit value of "14" in the communication port group 56 of the input unit 4B. In the input unit 4B, the LED 71 corresponding to the bit value of "14" is turned on.

The user can check that the wiring is correct by checking that the LED 71 with the bit value of "14" in the controller 3 is turned on in response to pressing of the pressing button switch 72 with the bit value of "14" in the master module 52A.

Conversely, when the wiring of the signal line group 57 is not correct, the ON signal output from the communication port with the bit value of "14" in the communication port group 55 is input via the communication port with a different bit value on the side of the communication port group 56. Therefore, the LED 71 with the different bit value is turned on. The user can recognize the incorrectness of the wiring and correct the wiring based on the fact the bit value of the pressed pressing button switch 72 does not match the bit value of the LED 71 which is turned on.

Finally, the user can check that the wiring of all the communication ports are correct by performing a similar test on all the communication ports (for example, sixteen communication ports with bit values of "00" to "15").

Preventive Measures for Erroneous Wiring: Second Example

Figure 21:
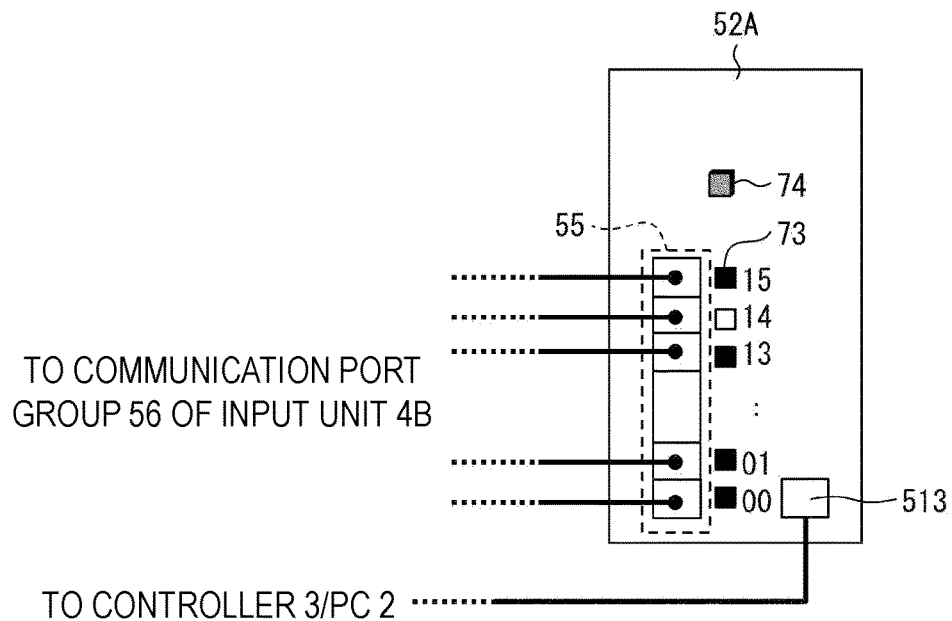
FIG. 21 is a diagram illustrating another example of the connection configuration between the input unit and the master module according to an aspect of the present disclosure.

FIG. 21 is a diagram illustrating another example of the connection configuration between the input unit 4B and the master module 52A. In the second example, an LED 73 is provided for each communication port of the upstream communication port group 55 in the master module 52A and one test switch 74 (second input unit) is provided unlike the first example.

The test switch 74 of the master module 52A is an input unit with which the user inputs an instruction to start a wiring test to the master module 52A. When the test switch 74 is pressed, the master module 52A starts the wiring test.

Specifically, the operation signal processing unit 43 of the master module 52A outputs the ON signal sequentially from the communication port with the bit value of "15" to the communication port with the bit value of "00." It is preferable to turn on the LED 73 of each communication port at a timing at which the ON signal is output.

When the wiring of the signal line group 57 is correct, the ON signal is input sequentially from the communication port with the bit value of "15" to the communication port with the bit value of "00" on the side of the communication port group 56 of the input unit 4B. Accordingly, the LED 71 corresponding to each communication port is turned on at a timing at which the ON signal is received.

The user can check a situation in which the LED 71 is turned on and can check that the wiring of all the communication ports is correct based on the LEDs 71 which are correctly turned on in a pre-decided sequence from the bit value of "15" to the bit value of "00."

When the master module 52A includes the communication unit 513, the user may operate the controller 3 or the PC 2 connected to the controller 3 instead of pressing the test switch 74 to perform an instruction to start the wiring test so that a command to start the wiring test is transmitted from the communication unit 613 and is received by the master module 52A via the communication unit 513.

Preventive Measures for Erroneous Wiring: Third Example

Still another example of the preventive measures for erroneous wiring, the master module 52A and the controller 3 can be configured so that serial data is sent from the master module 52A to the controller 3 for each communication port to check the correctness of the wiring in the controller 3.

Figure 22:
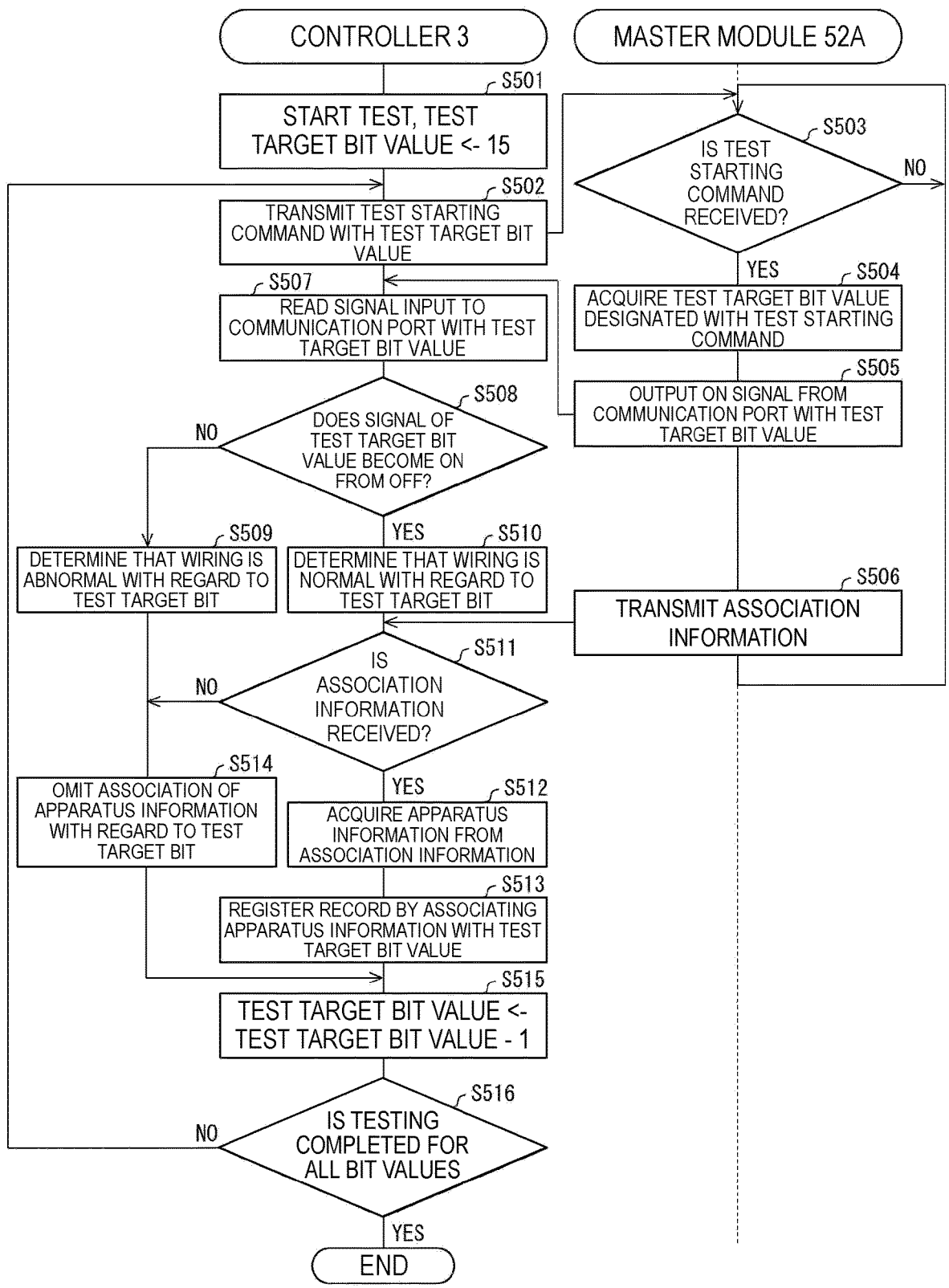
FIG. 22 is a flowchart illustrating a flow of a process of each device belonging to the communication system according to an aspect of the present disclosure.

FIG. 22 is a flowchart illustrating a flow of a process of each device belonging to the communication system 1. The flowchart illustrated in FIG. 22 shows, for example, a flow of processes when a wiring test is performed in the communication system 1 according to the configuration examples (1) to (4). When the third example is applied to the configuration example (3), it is necessary to connect the master module 52A to the controller 3 via the communication units 513 and 613, respectively, so that communication is possible when at least the wiring test is performed. A processing procedure to be described below is merely exemplary and each process may be changed as much as possible.

Steps may be omitted, substituted, and added appropriately to the processing procedure to be described below according to an embodiment.

In S501 (an acquisition step), the controller 3 starts performing the wiring test in response to, for example, an input instruction from the user. For example, when the wiring test is determined in advance to start from the communication port with the bit value of "15," the controller 3 acquires "15" as a test target bit value (target port identification information).

In S502, the controller 3 transmits a test starting command to give an instruction to start the wiring test to the master module 52A via the communication unit 613 along with information for designating the test target bit value.

In S503, when the master module 52A awaits the test starting command and receives the test starting command via the communication unit 513, the process proceeds to S504 because of YES of S503.

In S504, the master module 52A acquires the test target bit value (for example, "15") designated in the received test starting command.

In S505, after S504, the master module 52A outputs the ON signal for testing from the communication port with the test target bit value in the upstream communication port group 55.

In S506, after S505, the master module 52A may generate the association information in which the apparatus information of the electric apparatus 6 connected via the communication port with the test target bit value in the downstream communication port group 54 is associated with the test target bit value and may transmit the association information to the controller 3 via the communication unit 513.

In S507, after S502, the controller 3 reads the signal input to the communication port with test target bit value in the communication port group 56 of the input unit 4B.

In S508 (a determination step), the controller 3 determines ON or OFF of the signal input to the communication port with the test target bit value. When the signal with the test target bit value remains off without being turning on, the controller 3 causes the process to proceed to S509 because of NO of S508. When the signal with the test target bit value is turned on from off, the controller 3 causes the process to proceed to S510 because of YES of S508.

In S509 (a detection step), the controller 3 detects that the wiring abnormality has occurred in the communication port with the test target bit value and stores a test result indicating the wiring abnormality in association with the test target bit value.

In S510, the controller 3 determines that the wiring is correct in the communication port with the test target bit value.

In S511, the controller 3 determines whether the association information is received from the communication port with the test target bit value for which the wiring is checked to be correct.

When the association information is received, the controller 3 causes the process to proceed to S512 because of YES of S511. When the association information is not received, the process proceeds to S514 because of NO of S511.

In S512, the controller 3 acquires the apparatus information included in the association information transmitted from the master module 52A.

In S513, the controller 3 generates a record based on the test target bit value and the acquired apparatus information and registers the record in the configuration table. For example, the controller 3 generates the record 1020 illustrated in FIG. 11 and registers the configuration table illustrated in FIG. 12.

In S514, on the other hand, the controller 3 omits the process of associating the apparatus information with the test target bit value. The process is omitted when the wiring abnormality in the communication port with the test target bit is detected or the association information is not received from the communication port despite the wiring determined to be normal.

In S515 (an acquisition step), the controller 3 acquires a subsequent test target bit value. For example, the controller 3 acquires a bit value of "15−1=14" as the test target bit value.

In S516, when there is the acquired bit value of "14," for example, the acquired bit value is equal to or greater than 0 (test target bit value≥0), the controller 3 determines that the wiring test has not been completed, returns the process to S502 because of NO of S516, and repeats the processes after S502 on the subsequent test target bit value. Conversely, there is no acquired bit value, for example, the test target bit value <0, the controller 3 determines that the wiring test has been completed for all the communication ports, determines Yes in S516, and then ends the series of processes. Here, the controller 3 may output presence or absence of the wiring abnormality of all the bits and a test result indicating the apparatus information associated for each bit to the PC 2 or the like. Thus, when the user can check the presence or absence of the wiring abnormality with the PC 2 and there is the wiring abnormality, the user can take countermeasures against the abnormality, for example, by performing the wiring again.

According to the above-described method, in addition to the checking of the wiring, a correspondent relation between the communication ports and the electric apparatuses 6 can be registered in various devices upstream from the input unit 4.

Examples Realized by Software

Control blocks of the signal processing device 100, the input unit 4, the master module 52A, and the controller 3 may be realized by logic circuits (hardware) formed in integrated circuits (IC chips) or may be realized by software.

In the latter case, the signal processing device 100, the input unit 4, the master module 52A, and the controller 3 include a computer that performs a command of a program which is software realizing each function. The computer includes, for example, one or more processors and includes a computer-readable recording medium that stores the program. In the computer, the processor reads the program from the recording medium and executes the program, so that an objective of the present invention is attained. As the processor, for example, a central processing unit (CPU) can be used. As the recording medium, a "non-transitory medium," for example, a tape, a disc, a card, a semiconductor memory, a programmable logic circuit, or the like, can be used in addition to, for example, a read-only memory (ROM). A random access memory (RAM) on which the program is loaded may be further included. The program may be supplied to the computer via any transmission medium (a communication network, broadcasting waves, or the like) by which the program can be transmitted. An aspect of the present invention can also be realized in a form of a data signal in which the program is embedded in carrier waves and embodied through electronic transmission.

In the present invention, the following configurations are adopted to solve the above-described problems as examples of the present disclosure.

That is, a master module according to an aspect of the present disclosure is a master module that mediates communication between an electric apparatus to which a signal processing device is connected and an apparatus control device that controls the electric apparatus. The signal processing device includes a superimposition circuit that transmits an operation signal in accordance with an operation element state of the electric apparatus to another device and transmits a data signal indicating predetermined information as a superimposed signal superimposed on the operation signal to the other device, and an information storage unit that stores the predetermined information. The master module includes: a plurality of first communication ports that respectively connects a plurality of the signal processing devices via communication cables for transmitting the superimposed signal; a data signal processing unit that extracts the data signal from the superimposed signal received through the first communication port; an abnormality information generation unit that, based on status information that is included in the extracted data signal and indicates an abnormal state of the electric apparatus, generates abnormality information which indicates information related to the abnormality that has occurred; and an information output unit that outputs the abnormality information so that the apparatus control device is able to acquire the abnormality information.

With the configuration, although the apparatus control device does not correspond to the superimposed signal communication and does not have a configuration in which the data signal related to the abnormality is extracted from the superimposed signal transmitted from the signal processing device of the electric apparatus, the apparatus control device can be informed of occurrence of the abnormality. Thus, the apparatus control device can monitor the abnormality of a system using the superimposed signal despite non-correspondence to the superimposed signal communication. As a result, it is possible to obtain the advantageous effect that a device or the like which does not correspond to communication using the superimposed signal can be used in a system using the superimposed signal.

In the master module according to the aspect, the abnormality information generation unit may generate, as the abnormality information, at least one of an abnormality occurrence notification for notifying the apparatus control device that the abnormality has occurred and abnormality detailed information including first information for specifying the electric apparatus in which the abnormality has occurred and second information indicating content of the occurring abnormality.

With the configuration, the abnormality occurrence notification can be supplied to the apparatus control device which does not correspond to the superimposed signal communication. Thus, the apparatus control device can detect at least occurrence of the abnormality and can change over to the countermeasure process against the abnormality using the detection as a trigger. According to a circumstance, the abnormality detailed information can be supplied to the apparatus control device which does not correspond to the superimposed signal communication. Thus, the apparatus control device can detect occurrence of the abnormality and can also specify the electric apparatus in which the abnormality has occurred and specify the content of the occurring abnormality. As a result, it is possible to obtain the advantageous effect that a device or the like which does not correspond to communication using the superimposed signal can be used in a system using the superimposed signal.

The master module according to the aspect may further include a plurality of second communication ports that respectively connects the apparatus control device via a plurality of first signal lines for transmitting the superimposed signal or the operation signal extracted from the superimposed signal to the apparatus control device for each electric apparatus and second signal lines for transmitting the abnormality occurrence notification to the apparatus control device. The abnormality information generation unit may generate a first ON-OFF signal processed by the apparatus control device as the abnormality occurrence notification. The information output unit may transmit the first ON-OFF signal to the apparatus control device via the second signal lines.

With the configuration, a first report of the occurrence of the abnormality is transmitted as an alarm signal from the master module to the apparatus control device via the second signal line. The apparatus control device can quickly detect occurrence of the abnormality and can change over to the countermeasure process.

The master module according to the aspect may further include a second communication unit that communicates with a first communication unit included in the apparatus control device in conformity with a predetermined communication standard. The information output unit may transmit the abnormality detailed information to the apparatus control device via the second communication unit.

With the configuration, the abnormality detailed information can be supplied to the apparatus control device through the communication in conformity to the predetermined communication standard.

In the master module according to the aspect, the abnormality information generation unit may generate a second ON-OFF signal converted into serial data to be processed as the abnormality detailed information in the apparatus control device. The information output unit may transmit the second ON-OFF signal to the apparatus control device via the second signal line in place of the first ON-OFF signal or after the first ON-OFF signal.

With the configuration, although a separate communication unit in conformity with the predetermined communication standard is not provided, the abnormality occurrence notification and the abnormality detailed information can be supplied to the apparatus control device using the second signal line.

The master module according to the aspect may further include an operation signal processing unit extracts the operation signal from the superimposed signal received via the first communication port and transmits the operation signal from the second communication port corresponding to the first communication port through which the superimposed signal is received to the apparatus control device via the first signal line.

With the configuration, the operation signal which can be processed can be supplied to the apparatus control device which cannot separate the operation signal from the superimposed signal. Thus, the apparatus control device can ascertain a state of the electric apparatus based on the operation signal.

The master module according to the aspect may further include an operation signal processing unit that transmits the superimposed signal received via the first communication port from the second communication port corresponding to the first communication port through which the superimposed signal is received to the apparatus control device via the first signal line.

With the configuration, the superimposed signal can be supplied to the apparatus control device capable of processing the superimposed signal as the operation signal without being processed. A configuration necessary to separate the operation signal can be omitted, and thus the configuration of the master module can be simplified.

The master module according to the aspect may further include an information association unit that generates association information used to associate apparatus information for identifying the electric apparatus, which is included in the extracted data signal, with port identification information for identifying the first communication port through which the superimposed signal is received. The information output unit may output the association information so that the apparatus control device is able to acquire the association information.

With the configuration, the association information can be supplied to the apparatus control device. The apparatus control device can ascertain the correspondent relation between the electric apparatus and the communication port based on the association information and can identify the electric apparatus of a transmission source of a signal (for example, the operation signal or the superimposed signal including the operation signal) based on the communication port to which the signal is input.

In the master module according to the aspect, each second communication port may include a first input unit used for a user to give an instruction to transmit a test signal from the second communication port to the apparatus control device via the first signal line. The test signal may be a signal that is received via a third communication port, among a plurality of third communication ports included in the apparatus control device, connected via the first signal line to the second communication port through which the test signal is transmitted and changes a display aspect of a display unit corresponding to the third communication port.

With the configuration, the user can check that a pair of the second and third communication ports is correctly connected via the first signal line. As a result, erroneous wiring can be prevented.

The master module according to the aspect may further include a second input unit used for a user to give an instruction to transmit test signals from the plurality of second communication ports via the first signal lines to the apparatus control device. The operation signal processing unit may transmit the test signal to the apparatus control device from each of the plurality of second communication ports in a predetermined order in response to an operation performed on the second input unit. The test signal may be a signal that is received via a third communication port, among a plurality of third communication ports included in the apparatus control device, connected via the first signal line to the second communication port through which the test signal is transmitted and changes a display aspect of a display unit corresponding to the third communication port.

With the configuration, the user can ascertain that the pair of second and third communication ports can be correctly connected via the first signal line. As a result, erroneous wiring can be prevented.

A control program according to another aspect of the present disclosure is a control program of an apparatus control device controlling an electric apparatus to which a signal processing device is connected by communicating via a master module. The signal processing device includes a superimposition circuit that transmits an operation signal in accordance with an operation element state of the electric apparatus to another device and transmits a data signal indicating predetermined information as a superimposed signal superimposed on the operation signal to the other device, and an information storage unit that stores the predetermined information. The control program causes the apparatus control device to perform: an abnormality detection step of detecting that abnormality has occurred in accordance with reception of abnormality information which is transmitted by the master module and indicates information regarding the abnormality occurring in the electric apparatus; an apparatus specifying step of specifying an electric apparatus in which the abnormality has occurred based on first information which is included in abnormality detailed information in the abnormality information transmitted by the master module and is used to specify the electric apparatus in which the abnormality has occurred; and an abnormality specifying step of specifying content of the abnormality which has occurred based on second information which is included in the abnormality detailed information and indicates the content of the abnormality which has occurred.

With the configuration, the apparatus control device can monitor the abnormality of the system using the superimposed signal based on the abnormality information supplied from the master module despite non-correspondence to the superimposed signal communication. As a result, it is possible to obtain the advantageous effect that a device or the like which does not correspond to communication using the superimposed signal can be used in a system using the superimposed signal.

In the control program according to the aspect, the master module may include a plurality of second communication ports that respectively connects the apparatus control device via a plurality of first signal lines for transmitting the superimposed signal or the operation signal extracted from the superimposed signal to the apparatus control device for each electric apparatus. The apparatus control device may include a plurality of third communication ports for receiving the superimposed signal or the operation signal from the master module for each electric apparatus. The superimposed signal or the operation signal related to one electric apparatus may be transmitted or received via a port pair of the second communication port and the third communication port to which identical port identification information is allocated. The control program causes the apparatus control device to perform: an acquisition step of acquiring target port identification information for identifying the third communication port of a test target; a determination step of determining whether a test signal is input from the master module to the third communication port indicated by the target port identification information; and a detection step of detecting a wire abnormality of the first signal line based on the test signal which is not input to the third communication port indicated by the target port identification information.

With the configuration, the user can check that a port pair of the second communication port and the third communication port is correctly connected via the first signal line. As a result, erroneous wiring can be prevented.

The present invention is not limited to the above-described embodiments and can be modified in various forms within the scope of the claims, and embodiments obtained by appropriately combining technical means disclosed in different embodiments are also included in the technical range of the present invention.

The invention claimed is:
1. A computing device comprising:
a plurality of first communication ports that respectively connects a signal processing device in each of a plurality of electric apparatus via communication cables for receiving a superimposed signal;
a processor configured to:
extract a data signal from the superimposed signal received through one of the plurality of first communication ports;
generate abnormality information which indicates information related to an abnormality that has occurred, based on status information that is included in the extracted data signal and indicates an abnormal state of an electric apparatus among the plurality of electric apparatus;
output the abnormality information so that an apparatus control device acquires the abnormality information; and
generate, as the abnormality information, at least one of an abnormality occurrence notification for notifying the apparatus control device that an abnormality has occurred and abnormality detailed information including first information for specifying the electric apparatus in which the abnormality has occurred and second information indicating content of the occurring abnormality,
wherein the computing device is configured to convert and convey communication between the electric apparatus to which the signal processing device is connected and the apparatus control device that controls the electric apparatus,
wherein the signal processing device includes:
a superimposition circuit that transmits an operation signal in accordance with an operation element state of the electric apparatus to the computing device and transmits the data signal indicating predetermined information that includes at least the status information as the superimposed signal superimposed on the operation signal to the computing device, and
a memory is configured to store the predetermined information, wherein the apparatus control device is configured to determine, at least based on the abnormality information, whether the abnormality has occurred in the electric apparatus or a wire of the communication cables connecting the electric apparatus to the computing device based on the abnormality information.

2. The computing device according to claim 1, comprising:
a plurality of second communication ports that respectively connects the apparatus control device via a plurality of first signal lines for transmitting the superimposed signal or the operation signal extracted from the superimposed signal to the apparatus control device for each electric apparatus and second signal lines for transmitting the abnormality occurrence notification to the apparatus control device,
wherein the processor is configured to generate a first ON-OFF signal processed by the apparatus control device as the abnormality occurrence notification, and
wherein the processor is configured to transmit the first ON-OFF signal to the apparatus control device via the second signal lines.

3. The computing device according to claim 2,
wherein the processor is configured to generate a second ON-OFF signal converted into serial data to be processed as the abnormality detailed information in the apparatus control device, and wherein the processor is configured to transmit the second ON-OFF signal to the apparatus control device via the second signal lines in place of the first ON-OFF signal or after the first ON-OFF signal.

4. The computing device according to claim 3, wherein the processor is configured to:

generate association information used to associate apparatus information for identifying the electric apparatus, which is included in the extracted data signal, with port identification information for identifying the first communication port through which the superimposed signal is received, wherein the processor is configured to output the association information so that the apparatus control device acquires the association information.

5. The computing device according to claim 2, wherein the processor is configured to:

extract the operation signal from the superimposed signal received via the one of the plurality of first communication ports and transmit the operation signal from one of the plurality of second communication ports corresponding to the one of the plurality of first communication ports through which the superimposed signal is received to the apparatus control device via one of the plurality of first signal lines.

6. The computing device according to claim 5, comprising:

a second switch used for a user to give an instruction to transmit test signals from the plurality of second communication ports via the plurality of first signal lines to the apparatus control device, wherein the processor is configured to transmit the test signal to the apparatus control device from each of the plurality of second communication ports in a predetermined order in response to an operation performed on the second switch, and wherein the test signal is a signal that is received via a third communication port, among a plurality of third communication ports included in the apparatus control device, connected via second one of the plurality of first signal lines to second one of the plurality of second communication ports through which the test signal is transmitted and changes a display aspect of a display unit corresponding to the third communication port.

7. The computing device according to claim 5, wherein each second communication port includes a first switch used for a user to give an instruction to transmit a test signal from second one of the plurality of second communication ports to the apparatus control device via second one of the plurality of first signal lines, and wherein the test signal is a signal that is received via a third communication port, among a plurality of third communication ports included in the apparatus control device, connected via the second one of the plurality of first signal lines to the second one of the plurality of second communication ports through which the test signal is transmitted and changes a display aspect of a display unit corresponding to the third communication port.

8. The computing device according to claim 2, wherein the processor is configured to:

transmit the superimposed signal received via the one of the plurality of first communication ports from one of the plurality of second communication ports corresponding to the one of the plurality of first communication ports through which the superimposed signal is received to the apparatus control device via one of the plurality of first signal lines.

9. The computing device according to claim 8, wherein each second communication port includes a first switch used for a user to give an instruction to transmit a test signal from second one of the plurality of second communication ports to the apparatus control device via second one of the plurality of first signal lines, and wherein the test signal is a signal that is received via a third communication port, among a plurality of third communication ports included in the apparatus control device, connected via the second one of the plurality of first signal lines to the second one of the plurality of second communication ports through which the test signal is transmitted and changes a display aspect of a display unit corresponding to the third communication port.

10. The computing device according to claim 8, comprising:

a second switch used for a user to give an instruction to transmit test signals from the plurality of second communication ports via the plurality of first signal lines to the apparatus control device, wherein the processor is configured to transmit the test signal to the apparatus control device from each of the plurality of second communication ports in a predetermined order in response to an operation performed on the second switch, and wherein the test signal is a signal that is received via a third communication port, among a plurality of third communication ports included in the apparatus control device, connected via second one of the plurality of first signal lines to second one of the plurality of second communication ports through which the test signal is transmitted and changes a display aspect of a display unit corresponding to the third communication port.

11. The computing device according to claim 2, wherein each second communication port includes a first switch used for a user to give an instruction to transmit a test signal from one of the plurality of second communication ports to the apparatus control device via one of the plurality of first signal lines, and wherein the test signal is a signal that is received via a third communication port, among a plurality of third communication ports included in the apparatus control device, connected via the one of the plurality of first signal lines to the one of the plurality of second communication ports through which the test signal is transmitted and changes a display aspect of a display unit corresponding to the third communication port.

12. The computing device according to claim 2, comprising:

a second communication interface is configured to communication with a first communication interface included in the apparatus control device in conformity with a predetermined communication standard, wherein the processor is configured to transmit the abnormality detailed information to the apparatus control device via the second communication interface.

13. The computing device according to claim 2, wherein the processor is configured to:

generate association information used to associate apparatus information for identifying the electric apparatus, which is included in the extracted data signal, with port identification information for identifying the one of the plurality of first communication ports through which the superimposed signal is received, wherein the processor is configured to output the association information so that the apparatus control device acquires the association information.

14. The computing device according to claim 1, comprising:
a second communication interface is configured to communication with a first communication interface included in the apparatus control device in conformity with a predetermined communication standard,
wherein the processor is configured to transmit the abnormality detailed information to the apparatus control device via the second communication interface.

15. The computing device according to claim 14, wherein the processor is configured to:
generate association information used to associate apparatus information for identifying the electric apparatus, which is included in the extracted data signal, with port identification information for identifying the one of the plurality of first communication ports through which the superimposed signal is received,
wherein the processor is configured to output the association information so that the apparatus control device acquires the association information.

16. The computing device according to claim 1, wherein the processor is configured to:
generate association information used to associate apparatus information for identifying the electric apparatus, which is included in the extracted data signal, with port identification information for identifying the one of the plurality of first communication ports through which the superimposed signal is received,
wherein the processor is configured to output the association information so that the apparatus control device acquires the association information.

17. The computing device according to claim 1, wherein the processor is configured to:
generate association information used to associate apparatus information for identifying the electric apparatus, which is included in the extracted data signal, with port identification information for identifying the one of the plurality of first communication ports through which the superimposed signal is received,
wherein the processor is configured to output the association information so that the apparatus control device acquires the association information.

18. A non-transitory computer readable medium, storing a control program of an apparatus control device controlling an electric apparatus to which a signal processing device is connected by communicating via a computing device,
wherein the signal processing device includes
a superimposition circuit that transmits an operation signal in accordance with an operation element state of the electric apparatus to the computing device and transmits a data signal indicating predetermined information as a superimposed signal superimposed on the operation signal to the computing device, and
a memory is configured to store the predetermined information,
wherein the computing device is configured to:
generate abnormality information which indicates information related to an abnormality that has occurred, based on status information that is included in the extracted data signal and indicates an abnormal state of an electric apparatus among the plurality of electric apparatus;
output the abnormality information so that an apparatus control device acquires the abnormality information; and
generate, as the abnormality information, at least one of an abnormality occurrence notification for notifying the apparatus control device that an abnormality has occurred and abnormality detailed information including first information for specifying the electric apparatus in which the abnormality has occurred and second information indicating content of the occurring abnormality,
wherein the control program causes the apparatus control device to perform:
an abnormality detection step of detecting that the abnormality has occurred in accordance with reception of the abnormality information which is transmitted by the computing device and indicates information regarding the abnormality occurring in the electric apparatus;
an apparatus specifying step of specifying the electric apparatus in which the abnormality has occurred based on the first information which is included in the abnormality detailed information in the abnormality information transmitted by the computing device and is used to specify the electric apparatus in which the abnormality has occurred; and
an abnormality specifying step of specifying content of the abnormality which has occurred based on second information which is included in the abnormality detailed information and indicates the content of the abnormality which has occurred, and
wherein the apparatus control device determines, at least based on the abnormality information, whether the abnormality has occurred in the electric apparatus or a wire of the communication cables connecting the electric apparatus to the computing device based on the abnormality information.

19. The non-transitory computer readable medium according to claim 18,
wherein the computing device includes a plurality of second communication ports that respectively connects the apparatus control device via a plurality of first signal lines for transmitting the superimposed signal or the operation signal extracted from the superimposed signal to the apparatus control device for each electric apparatus,
wherein the apparatus control device includes a plurality of third communication ports for receiving the superimposed signal or the operation signal from the computing device for each electric apparatus,
wherein the superimposed signal or the operation signal related to one electric apparatus is transmitted or received via a port pair of the plurality of second communication ports and the plurality of third communication ports to which identical port identification information is allocated, and
wherein the control program causes the apparatus control device to perform:
an acquisition step of acquiring target port identification information for identifying one of the plurality of third communication ports of a test target;
a determination step of determining whether a test signal is input from the computing device to the one of the plurality of third communication ports indicated by the target port identification information; and
a detection step of detecting a wire abnormality of the plurality of first signal lines based on the test signal which is not input to the one of the plurality of third communication ports indicated by the target port identification information.

\* \* \* \* \*